US012726895B2

(12) United States Patent
Wu

(10) Patent No.: US 12,726,895 B2
(45) Date of Patent: Sep. 1, 2026

(54) METHOD AND DEVICE IN NODES USED FOR WIRELESS COMMUNICATION

(71) Applicant: SHANGHAI CODUS TECHNOLOGY COMPANY LIMITED, Shanghai (CN)

(72) Inventor: Lu Wu, Shanghai (CN)

( * ) Notice: Subject to any disclaimer, the term of this patent is extended or adjusted under 35 U.S.C. 154(b) by 231 days.

(21) Appl. No.: 18/512,030

(22) Filed: Nov. 17, 2023

(65) Prior Publication Data

US 2024/0114448 A1 Apr. 4, 2024

Related U.S. Application Data

(63) Continuation of application No. PCT/CN2022/093179, filed on May 17, 2022.

(30) Foreign Application Priority Data

May 20, 2021 (CN) ......................... 202110549926.6

(51) Int. Cl.
*H04W 4/00* (2018.01)
*H04L 5/00* (2006.01)
(Continued)

(52) U.S. Cl.
CPC ........... *H04W 48/20* (2013.01); *H04L 5/0048* (2013.01); *H04W 48/10* (2013.01)

(58) Field of Classification Search
CPC ..... H04W 48/20; H04W 48/10; H04W 72/04; H04W 72/0453; H04W 72/046;
(Continued)

(56) References Cited

U.S. PATENT DOCUMENTS 11,265,866 B2 * 3/2022 Bagheri ............ H04W 72/0453
11,425,706 B2 * 8/2022 Cirik ...................... H04B 7/088
(Continued)

FOREIGN PATENT DOCUMENTS

CN 111586862 A 8/2020
CN 111600692 A 8/2020
WO 2020202014 A1 10/2020

OTHER PUBLICATIONS

ISR received in application No. PCT/CN2022/093179 dated Aug. 3, 2022.

(Continued)

*Primary Examiner* — Phuongchau Ba Nguyen
(74) *Attorney, Agent, or Firm* — Abd Almonem Doolaanea

(57) ABSTRACT

The present application discloses a method and a device in a node for wireless communications. A first node receives a first signaling; and monitors control channel candidates in S search space sets. A first field in the first signaling determines a first TCI state group; the first signaling is used to determine a first time; starting from the first time, the first TCI state group is used for monitoring a first control channel candidate set; a number of TCI state(s) comprised by the first TCI state group is used to determine the first control channel candidate set in the S search space sets; when the first TCI state group comprises only one TCI state, the first control channel candidate set does not comprise any control channel candidate that satisfies a first condition in the S search space sets.

20 Claims, 7 Drawing Sheets

(51) Int. Cl.
*H04W 48/10* (2009.01)
*H04W 48/20* (2009.01)

(58) Field of Classification Search
CPC ... H04W 28/04; H04W 72/042; H04W 88/08; H04W 28/08; H04W 28/084; H04W 36/22; H04W 72/12; H04L 5/0048; H04L 5/0094; H04L 5/00; H04L 5/0053; H04L 5/0007
See application file for complete search history.

(56) References Cited

U.S. PATENT DOCUMENTS

| | | | | |
|---|---|---|---|---|
| 11,445,526 | B2 * | 9/2022 | Liu | H04W 72/52 |
| 11,805,535 | B2 * | 10/2023 | Liu | H04W 74/0808 |
| 12,082,200 | B2 * | 9/2024 | Takeda | H04W 72/53 |
| 2010/0254329 | A1 * | 10/2010 | Pan | H04L 5/001 370/329 |
| 2023/0319791 | A1 * | 10/2023 | Wu | H04W 72/044 370/330 |
| 2025/0343650 | A1 * | 11/2025 | Zhang | H04W 72/56 |

OTHER PUBLICATIONS

Huawei, HiSilicon "Enhancements on multi-TRP for reliability and robustness in Rel-17" 3GPP TSG RAN WG1 Meeting #104-e R1-2100209 Jan. 19, 2021.

* cited by examiner

First signaling —used to determine→ First time

Starting from first time, first TCI state group is used for monitoring first control channel candidate set

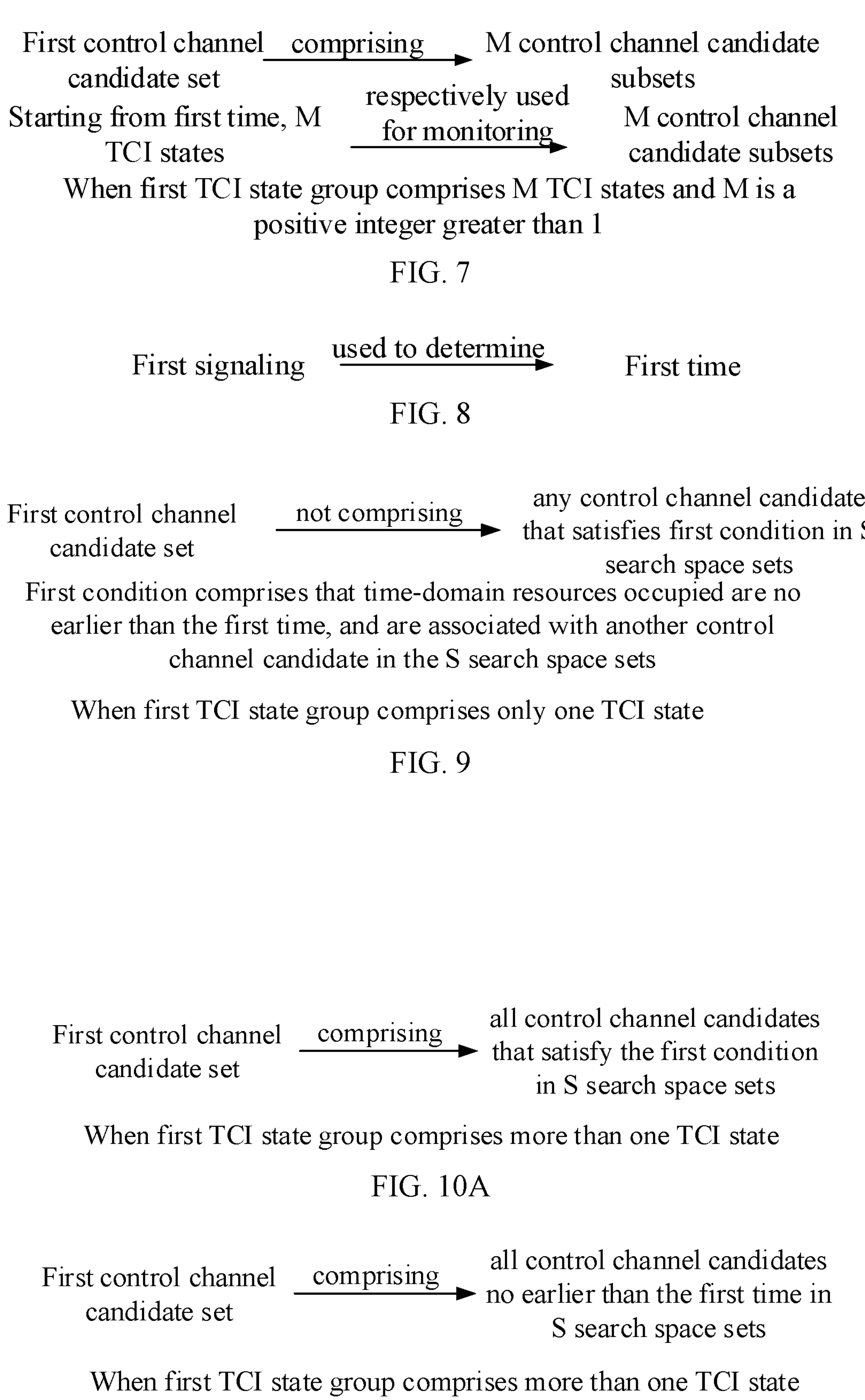
First control channel candidate set
comprising
M control channel candidate subsets
Starting from first time, M TCI states
respectively used for monitoring
M control channel candidate subsets
When first TCI state group comprises M TCI states and M is a positive integer greater than 1
FIG. 7
First signaling
used to determine
First time
FIG. 8
First control channel candidate set
not comprising
any control channel candidate that satisfies first condition in S search space sets
First condition comprises that time-domain resources occupied are no earlier than the first time, and are associated with another control channel candidate in the S search space sets
When first TCI state group comprises only one TCI state
FIG. 9
First control channel candidate set
comprising
all control channel candidates that satisfy the first condition in S search space sets
When first TCI state group comprises more than one TCI state
FIG. 10A
First control channel candidate set
comprising
all control channel candidates no earlier than the first time in S search space sets
When first TCI state group comprises more than one TCI state
FIG. 10B TCI state for monitoring control channel candidates in the reference search space set → remaining unchanged before and after the first time Reference search space set is any search space set among S search space sets that does not comprise one control channel candidate in first control channel candidate set

FIG. 11

First signaling —determining...out of M control resource set pools→ first control resource set pool First control channel candidate set —comprising→ all control channel candidates that do not satisfy the first condition but satisfy second condition in S search space sets Second condition comprises that time-domain resources occupied are no earlier than the first time and belong to first control resource set pool When first TCI state group comprises only one TCI state

FIG. 12

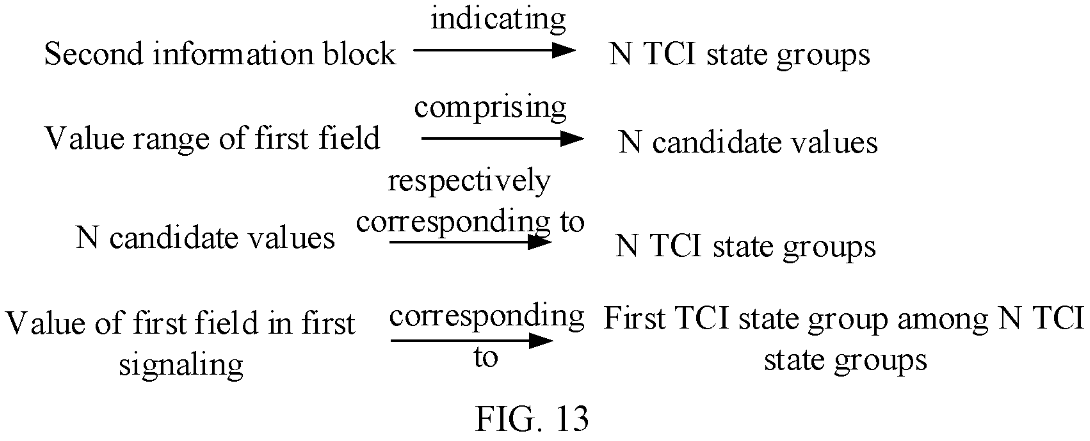

FIG. 13

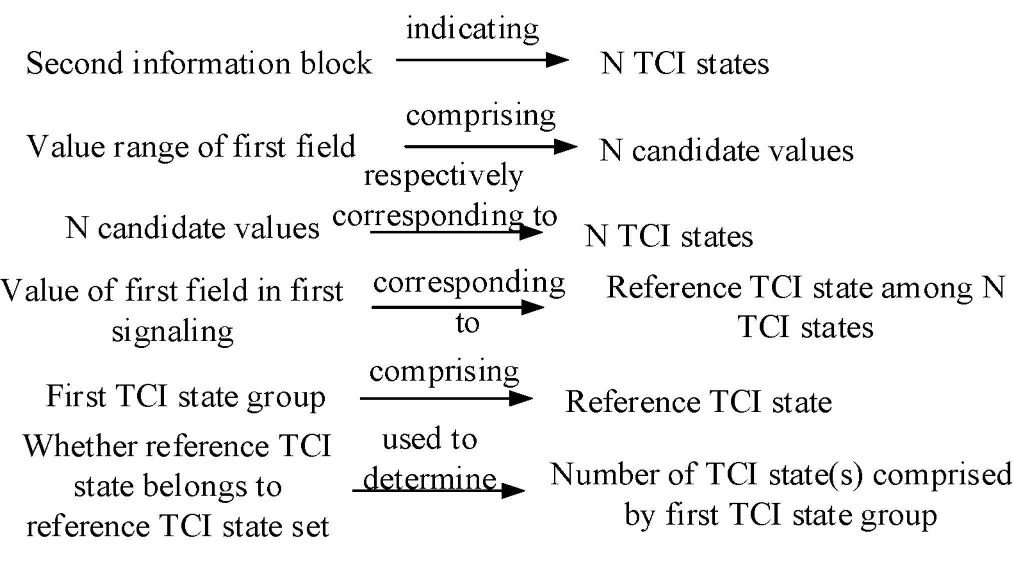

FIG. 14

Number of TCI state(s) comprised by first TCI state group = 1

First TCI state group —only comprising→ Reference TCI state (a)When reference TCI state does not belong to reference TCI state set The number of TCI state(s) comprised by first TCI state group is greater than 1

TCI state other than reference TCI state in first TCI state group is configured by higher layer parameter (b)When reference TCI state belongs to reference TCI state set

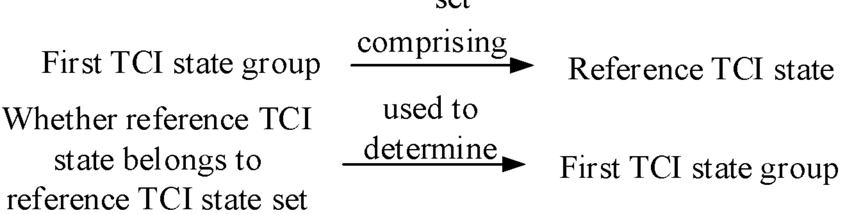

FIG. 15

First TCI state group —only comprising→ Reference TCI state
(a)When reference TCI state does not belong to reference TCI state set
First TCI state group is a TCI state group to which the reference TCI state belongs among T TCI state groups
(b)When reference TCI state belongs to reference TCI state set
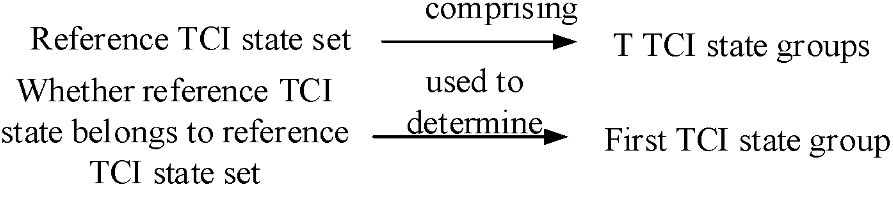
FIG. 16
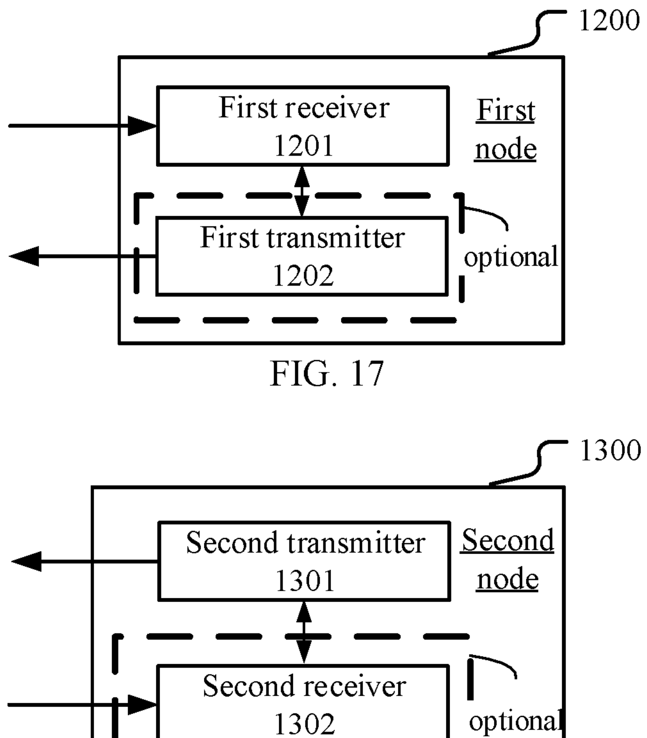
FIG. 17
FIG. 18

METHOD AND DEVICE IN NODES USED FOR WIRELESS COMMUNICATION

CROSS REFERENCE TO RELATED APPLICATIONS

This application is the international patent application No. PCT/CN2022/093179, filed on May 17, 2022, claims the priority benefit of Chinese Patent Application No. 202110549926.6, filed on May 20, 2021, the full disclosure of which is incorporated herein by reference.

BACKGROUND

Technical Field

The present application relates to transmission methods and devices in wireless communication systems, and in particular to a method and device for radio signal transmission in a wireless communication system supporting cellular networks.

Related Art

In New Radio (NR) R15 and R16, different beam management/indication mechanisms are respectively adopted by a control channel and a data channel, and for the uplink and the downlink. However, in many cases the control channel and the data channel can use the same beam, and since there exists channel reciprocity between an uplink channel and a downlink channel under many application scenarios, the same beam is also applicable. At the 3GPP Radio Access Network (RAN) 1 #103e conference, the technique of using physical layer signaling to update beams for the control channel and the data channel has been accepted.

SUMMARY

The applicant finds through researches that how a physical-layer signaling used for updating beams for both a control channel and a data channel influences the consistency between a transmitting end and a receiving end is an issue for consideration.

To address the above problem, the present application provides a solution. It should be noted that although the statement above only took the example of cellular networks, the present application also applies to other scenarios like Vehicle-to-Everything (V2X), where similar technical effects can be achieved. Additionally, the adoption of a unified solution for various scenarios, including but not limited to cellular networks and V2X, contributes to the reduction of hardcore complexity and costs. In the case of no conflict, the embodiments of any node and the characteristics in the embodiments may be applied to any other node, and vice versa. What's more, the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:

receiving a first information block;

receiving a first signaling; and monitoring control channel candidates in S search space sets;

herein, the first information block indicates S search space sets, S being a positive integer greater than 1; the first signaling comprises a first field, the first field in the first signaling determining a first Transmission Configuration Indicator (TCI) state group, the first TCI state group comprising at least one TCI state; the first signaling is used to determine a first time; starting from the first time, the first TCI state group is used for monitoring a first control channel candidate set; a number of TCI state(s) comprised by the first TCI state group is used to determine the first control channel candidate set in the S search space sets; when the first TCI state group comprises only one TCI state, the first control channel candidate set does not comprise any control channel candidate that satisfies a first condition in the S search space sets; the first condition comprises that time-domain resources occupied are no earlier than the first time, and are associated with another control channel candidate in the S search space sets.

In one embodiment, a problem to be solved in the present application includes: how to determine of which control channel candidates the beams are to be updated according to a beam update signaling.

In one embodiment, a problem to be solved in the present application includes: how to determine of which control channel candidates the beams are to be updated according to a beam update signaling in a case with multi-TRP being supported, where a control signaling can be transmitted only on a control channel candidate of one TRP but also can be transmitted repeatedly on control channel candidates corresponding to multiple TRPs.

In one embodiment, the essence of the above method lies in that a first signaling indicates that a beam of a first control channel candidate set is updated from a first time, where a first TCI state group indicates a new beam group; the first control channel candidate set is determined based on a number of beams comprised by the new beam group. An advantage of using the above method lies in that the beam update signaling implicitly determines which control channel candidates are to be updated, whereby reducing the signaling overhead and maintaining consistent transmitting and receiving beams, which further ensures the communication quality and transmission efficiency.

According to one aspect of the present application, characterized in that a reference search space set is any search space set among the S search space sets that does not comprise one control channel candidate in the first control channel candidate set, and a TCI state for monitoring control channel candidates in the reference search space set remains unchanged before and after the first time.

According to one aspect of the present application, characterized in that when the first TCI state group comprises more than one TCI state, the first control channel candidate set comprises all control channel candidates that satisfy the first condition in the S search space sets.

According to one aspect of the present application, characterized in that when the first TCI state group comprises more than one TCI state, the first control channel candidate set comprises all control channel candidates no earlier than the first time in the S search space sets.

According to one aspect of the present application, characterized in that when the first TCI state group comprises M TCI states and M is a positive integer greater than 1, the first control channel candidate set comprises M control channel candidate subsets, starting from the first time, the M TCI states are respectively used for monitoring the M control channel candidate subsets, any of the M control channel candidate subsets comprising at least one control channel candidate.

According to one aspect of the present application, characterized in that the first signaling is used to determine a first control resource set pool out of M control resource set pools, the first control resource set pool being one of the M control resource set pools, and any of the M control resource set pools comprising at least one control resource set, M being a positive integer greater than 1; when the first TCI state group comprises only one TCI state, the first control channel candidate set comprises all control channel candidates that do not satisfy the first condition but satisfy a second condition in the S search space sets; the second condition comprises that time-domain resources occupied are no earlier than the first time and belong to the first control resource set pool.

According to one aspect of the present application, characterized in comprising:

receiving a second information block;

herein, the second information block indicates N TCI state groups; a value range of the first field includes N candidate values, the N candidate values respectively corresponding to the N TCI state groups, where the first TCI state group is one of the N TCI state groups that corresponds to a value of the first field in the first signaling; any of the N TCI state groups comprises at least one TCI state, N being a positive integer greater than 1; any of the N candidate values is a non-negative integer.

According to one aspect of the present application, characterized in comprising:

receiving a second information block;

herein, the second information block indicates N TCI states; a value range of the first field includes N candidate values, and any candidate value of the N candidate values is a non-negative integer, N being a positive integer greater than 1; the N candidate values respectively correspond to N TCI states, where a reference TCI state is one of the N TCI states that corresponds to a value of the first field in the first signaling; the first TCI state group comprises the reference TCI state; whether the reference TCI state belongs to a reference TCI state set is used to determine the number of the TCI state(s) comprised by the first TCI state group; when the reference TCI state does not belong to the reference TCI state set, the number of the TCI state(s) comprised by the first TCI state group is equal to 1; when the reference TCI state belongs to the reference TCI state set, the number of the TCI state(s) comprised by the first TCI state group is greater than 1.

According to one aspect of the present application, characterized in that the reference TCI state set comprises T TCI state groups, any of the T TCI state groups comprising more than one TCI state, T being a positive integer greater than 1; when the reference TCI state belongs to the reference TCI state set, the first TCI state group is a TCI state group to which the reference TCI state belongs among the T TCI state groups; when the reference TCI state does not belong to the reference TCI state set, the first TCI state group only comprises the reference TCI state.

According to one aspect of the present application, characterized in comprising:

transmitting a first signal;

herein, the first signal comprises a HARQ-ACK associated with the first signaling.

According to one aspect of the present application, characterized in comprising:

receiving a second signal;

herein, the first signaling comprises scheduling information of the second signal.

The present application provides a method in a second node for wireless communications, comprising:

transmitting a first information block; and transmitting a first signaling;

herein, the first information block indicates S search space sets, S being a positive integer greater than 1; the first signaling comprises a first field, the first field in the first signaling determining a first Transmission Configuration Indicator (TCI) state group, the first TCI state group comprising at least one TCI state; the first signaling is used to determine a first time; starting from the first time, the first TCI state group is used by a target receiver of the first signaling for monitoring a first control channel candidate set; a number of TCI state(s) comprised by the first TCI state group is used to determine the first control channel candidate set in the S search space sets; when the first TCI state group comprises only one TCI state, the first control channel candidate set does not comprise any control channel candidate that satisfies a first condition in the S search space sets; the first condition comprises that time-domain resources occupied are no earlier than the first time, and are associated with another control channel candidate in the S search space sets.

According to one aspect of the present application, characterized in that a reference search space set is any search space set among the S search space sets that does not comprise one control channel candidate in the first control channel candidate set, and a TCI state used by a target receiver of the first signaling for monitoring control channel candidates in the reference search space set remains unchanged before and after the first time.

According to one aspect of the present application, characterized in that when the first TCI state group comprises more than one TCI state, the first control channel candidate set comprises all control channel candidates that satisfy the first condition in the S search space sets.

According to one aspect of the present application, characterized in that when the first TCI state group comprises more than one TCI state, the first control channel candidate set comprises all control channel candidates no earlier than the first time in the S search space sets.

According to one aspect of the present application, characterized in that when the first TCI state group comprises M TCI states and M is a positive integer greater than 1, the first control channel candidate set comprises M control channel candidate subsets, starting from the first time, the M TCI states are respectively used by a target receiver of the first signaling for monitoring the M control channel candidate subsets, any of the M control channel candidate subsets comprising at least one control channel candidate.

According to one aspect of the present application, characterized in that the first signaling is used to determine a first control resource set pool out of M control resource set pools, the first control resource set pool being one of the M control resource set pools, and any of the M control resource set pools comprising at least one control resource set, M being a positive integer greater than 1; when the first TCI state group comprises only one TCI state, the first control channel candidate set comprises all control channel candidates that do not satisfy the first condition but satisfy a second condition in the S search space sets; the second condition comprises that time-domain resources occupied are no earlier than the first time and belong to the first control resource set pool.

According to one aspect of the present application, characterized in comprising:

transmitting a second information block;

herein, the second information block indicates N TCI state groups; a value range of the first field includes N candidate values, the N candidate values respectively corresponding to the N TCI state groups, where the first TCI state group is one of the N TCI state groups that corresponds to a value of the first field in the first signaling; any of the N TCI state groups comprises at least one TCI state, N being a positive integer greater than 1; any of the N candidate values is a non-negative integer.

According to one aspect of the present application, characterized in comprising:

transmitting a second information block;

herein, the second information block indicates N TCI states; a value range of the first field includes N candidate values, and any candidate value of the N candidate values is a non-negative integer, N being a positive integer greater than 1; the N candidate values respectively correspond to N TCI states, where a reference TCI state is one of the N TCI states that corresponds to a value of the first field in the first signaling; the first TCI state group comprises the reference TCI state; whether the reference TCI state belongs to a reference TCI state set is used to determine the number of the TCI state(s) comprised by the first TCI state group; when the reference TCI state does not belong to the reference TCI state set, the number of the TCI state(s) comprised by the first TCI state group is equal to 1; when the reference TCI state belongs to the reference TCI state set, the number of the TCI state(s) comprised by the first TCI state group is greater than 1.

According to one aspect of the present application, characterized in that the reference TCI state set comprises T TCI state groups, any of the T TCI state groups comprising more than one TCI state, T being a positive integer greater than 1; when the reference TCI state belongs to the reference TCI state set, the first TCI state group is a TCI state group to which the reference TCI state belongs among the T TCI state groups; when the reference TCI state does not belong to the reference TCI state set, the first TCI state group only comprises the reference TCI state.

The method according to any of claims 1-8, characterized in comprising:

receiving a first signal;

herein, the first signal comprises a HARQ-ACK associated with the first signaling.

The method according to any of claims 1-9, characterized in comprising:

transmitting a second signal;

herein, the first signaling comprises scheduling information of the second signal.

The present application provides a first node for wireless communications, comprising:

a first receiver, receiving a first information block; receiving a first signaling; and monitoring control channel candidates in S search space sets;

herein, the first information block indicates S search space sets, S being a positive integer greater than 1; the first signaling comprises a first field, the first field in the first signaling determining a first Transmission Configuration Indicator (TCI) state group, the first TCI state group comprising at least one TCI state; the first signaling is used to determine a first time; starting from the first time, the first TCI state group is used for monitoring a first control channel candidate set; a number of TCI state(s) comprised by the first TCI state group is used to determine the first control channel candidate set in the S search space sets; when the first TCI state group comprises only one TCI state, the first control channel candidate set does not comprise any control channel candidate that satisfies a first condition in the S search space sets; the first condition comprises that time-domain resources occupied are no earlier than the first time, and are associated with another control channel candidate in the S search space sets.

The present application provides a second node for wireless communications, comprising:

a second transmitter, transmitting a first information block; and transmitting a first signaling;

herein, the first information block indicates S search space sets, S being a positive integer greater than 1;

the first signaling comprises a first field, the first field in the first signaling determining a first Transmission Configuration Indicator (TCI) state group, the first TCI state group comprising at least one TCI state; the first signaling is used to determine a first time; starting from the first time, the first TCI state group is used by a target receiver of the first signaling for monitoring a first control channel candidate set; a number of TCI state(s) comprised by the first TCI state group is used to determine the first control channel candidate set in the S search space sets; when the first TCI state group comprises only one TCI state, the first control channel candidate set does not comprise any control channel candidate that satisfies a first condition in the S search space sets; the first condition comprises that time-domain resources occupied are no earlier than the first time, and are associated with another control channel candidate in the S search space sets.

In one embodiment, compared with the prior art, the present application is advantageous in the following aspects:

reducing the signaling overhead;

keeping beams of both receiving and transmitting ends consistent;

ensuring the communication quality and transmission efficiency.

BRIEF DESCRIPTION OF THE DRAWINGS

Other features, objects and advantages of the present application will become more apparent from the detailed description of non-restrictive embodiments taken in conjunction with the following drawings:

FIG. 7 illustrates a schematic diagram of a relation between a first TCI state group and a first control channel candidate set according to another embodiment of the present application.

FIG. 8 illustrates a schematic diagram of a first signaling being used to determine a first time according to one embodiment of the present application.

FIG. 9 illustrates a schematic diagram of a relation between a number of TCI state(s) comprised by a first TCI state group and a first control channel candidate set according to one embodiment of the present application.

FIG. 10A-FIG. 10B illustrates a schematic diagram of a relation between a number of TCI state(s) comprised by a first TCI state group and a first control channel candidate set according to another embodiment of the present application.

FIG. 11 illustrates a schematic diagram of a TCI state of a reference search space set according to one embodiment of the present application.

FIG. 12 illustrates a schematic diagram of a first control channel candidate set with a first TCI state group comprising only one TCI state according to one embodiment of the present application.

FIG. 13 illustrates a schematic diagram of a first field in a first signaling being used to determine a first TCI state group according to one embodiment of the present application.

FIG. 14 illustrates a schematic diagram of a first field in a first signaling being used to determine a first TCI state group according to another embodiment of the present application.

FIG. 15 illustrates a schematic diagram of a relation between a first TCI state group and whether a reference TCI state belongs to a reference TCI state set according to one embodiment of the present application.

FIG. 16 illustrates a schematic diagram of a relation between a first TCI state group and whether a reference TCI state belongs to a reference TCI state set according to another embodiment of the present application.

FIG. 17 illustrates a structure block diagram of a processing device in a first node according to one embodiment of the present application.

FIG. 18 illustrates a structure block diagram of a processing device used in a second node according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
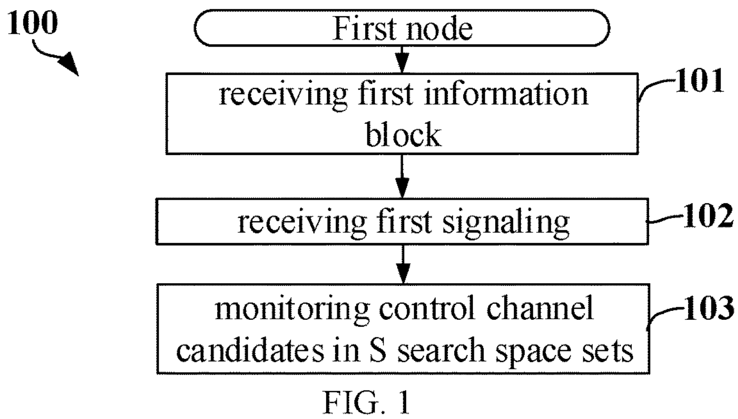
FIG. 1 illustrates a flowchart of a first information block, a first signaling and S search space sets according to one embodiment of the present application.

Embodiment 1 illustrates a flowchart of a first information block, a first signaling and S search space sets according to one embodiment of the present application, as shown in FIG. 1. In 100 illustrated by FIG. 1, each box represents a step. Particularly, the sequential step arrangement in each box herein does not imply a chronological order of steps marked respectively by these boxes.

In Embodiment 1, the first node in the present application receives a first information block in step 101; and receives a first signaling in step 102; and monitors control channel candidates in S search space sets in step 103; herein, the first information block indicates S search space sets, S being a positive integer greater than 1; the first signaling comprises a first field, the first field in the first signaling determining a first Transmission Configuration Indicator (TCI) state group, the first TCI state group comprising at least one TCI state; the first signaling is used to determine a first time; starting from the first time, the first TCI state group is used for monitoring a first control channel candidate set; a number of TCI state(s) comprised by the first TCI state group is used to determine the first control channel candidate set in the S search space sets; when the first TCI state group comprises only one TCI state, the first control channel candidate set does not comprise any control channel candidate that satisfies a first condition in the S search space sets; the first condition comprises that time-domain resources occupied are no earlier than the first time, and are associated with another control channel candidate in the S search space sets.

In one embodiment, the first information block is borne by a higher layer signaling.

In one embodiment, the higher layer signaling includes a Radio Resource Control (RRC) signaling.

In one embodiment, the higher layer signaling includes a MAC CE signaling.

In one embodiment, the first information block comprises one Information Element (IE) in an RRC signaling.

In one embodiment, the first information block comprises multiple IEs in an RRC signaling.

In one embodiment, the first information block comprises part of fields in an IE in an RRC signaling.

In one embodiment, the first information block comprises part of or all fields in an IE PDCCH-Config.

In one embodiment, the first information block comprises a field searchSpacesToAddModList in an IE PDCCH-Config.

In one embodiment, the first information block comprises an IE SearchSpace.

In one embodiment, a first information block indicates configuration information of the S search space sets.

In one embodiment, the first information block comprises S information sub-blocks, the S information sub-blocks respectively indicating S search space sets.

In one subembodiment, the S information sub-blocks respectively indicate configuration information of the S search space sets.

In one embodiment, configuration information of a search space comprises at least one of a search space set index, an associated control resource set, a control channel monitoring periodicity and offset, a number of control channel candidates per CCE Aggregation Level (AL) or a search space type.

In one embodiment, any information sub-block among the S information sub-blocks comprises an IE SearchSpace.

In one embodiment, S is no greater than 10.

In one embodiment, the S search space sets belong to a same BandWidth Part (BWP).

In one embodiment, the S search space sets belong to a same Carrier.

In one embodiment, the S search space sets belong to a same Serving Cell.

In one embodiment, the phrase that "the S search space sets belong to a same BandWidth Part (BWP)" includes a meaning that: the S search space sets belong to a same BWP in frequency domain.

In one embodiment, the phrase that "the S search space sets belong to a same BandWidth Part (BWP)" includes a meaning that: the S search space sets are configured for a same BWP.

In one embodiment, the first TCI state group comprises one or two TCI states.

In one embodiment, the first TCI state group comprises one or more TCI states.

In one embodiment, the first signaling is a physical layer signaling.

In one embodiment, the first signaling is a control signaling.

In one embodiment, the first signaling is a Downlink Control Information (DCI) signaling.

In one embodiment, the first signaling is transmitted on a Physical Downlink Control Channel (PDCCH).

In one embodiment, the first signaling schedules reception of a Physical Downlink Shared Channel (PDSCH).

In one embodiment, a higher layer parameter configures that the first signaling comprises the first field.

In one embodiment, a higher layer parameter tci-PresentInDCI configures that the first signaling comprises the first field.

In one embodiment, a name of the first field includes Transmission configuration indication.

In one embodiment, a name of the first field includes TCI.

In one embodiment, a name of the first field includes tci.

In one embodiment, the first field is a Transmission configuration indication field.

In one embodiment, the specific definition of the Transmission configuration indication field can be found in 3GPP TS38.212, section 7.3.

In one embodiment, the specific definition of the higher layer parameter tci-PresentInDCI can be found in 3GPP TS38.212, section 7.3.

In one embodiment, the first field comprises 3 bits.

In one embodiment, the first field comprises one bit.

In one embodiment, the first field comprises more than one bit.

In one embodiment, the first field comprises at least one bit.

In one embodiment, a number of bit(s) comprised by the first field is pre-defined.

In one embodiment, a number of bit(s) comprised by the first field is configured by a higher layer parameter.

In one embodiment, the higher layer parameter is an RRC parameter.

In one embodiment, the higher layer parameter is a MAC CE parameter.

In one embodiment, the meaning of the sentence that "the first field in the first signaling is used to determine a first TCI state group" includes: the first field in the first signaling indicates the first TCI state group.

In one embodiment, the meaning of the sentence that "the first field in the first signaling is used to determine a first TCI state group" includes: the first field in the first signaling indicates only one TCI state in the first TCI state group.

In one embodiment, any of the S Search Space Sets comprises at least one control channel candidate.

In one embodiment, any of the S Search Space Sets comprises multiple REs.

In one embodiment, the S Search Space Sets comprise at least one control channel candidate earlier than the first time in time domain and at least one control channel candidate no earlier than the first time in time domain.

In one embodiment, the specific definition of the Search Space Set can be found in 3GPP TS 38.213, Section 10.

In one embodiment, the action of "monitoring control channel candidates in S search space sets" includes "monitoring control channel candidate(s) in S search space sets by which time-domain resources occupied are earlier than the first time" and "monitoring control channel candidate(s) in S search space sets by which time-domain resources occupied are no earlier than the first time".

In one embodiment, the action of "monitoring control channel candidates in S search space sets" includes monitoring at least one control channel candidate in the S search space sets.

In one embodiment, the action of "monitoring control channel candidates in S search space sets" includes monitoring all control channel candidates in the S search space sets.

In one embodiment, the action of "monitoring control channel candidates in S search space sets" includes monitoring part of control channel candidates in the S search space sets.

In one embodiment, monitoring of at least one control channel candidate in the S search space sets is earlier than the action of "receiving a first signaling", and monitoring of at least one control channel candidate in the S search space sets is later than the action of "receiving a first signaling".

In one embodiment, monitoring of at least one control channel candidate in the S search space sets is no later than the action of "receiving a first signaling", and monitoring of at least one control channel candidate in the S search space sets is later than the action of "receiving a first signaling".

In one embodiment, a said control channel candidate is a Physical Downlink Control Channel (PDCCH) Candidate.

In one embodiment, a said control channel candidate is a monitored Physical Downlink Control Channel Candidate (Monitored PDCCH Candidate).

In one embodiment, a said control channel candidate occupies multiple Resource Elements (REs).

In one embodiment, a said control channel candidate occupies one or more Control Channel Elements (CCEs).

In one embodiment, a number of CCE(s) occupied by a said control channel candidate is equal to one of 1, 2, 4, 8 or 16.

In one embodiment, a CCE comprises 9 Resource Element Groups (REGs), of which one REG comprises 4 REs.

In one embodiment, a CCE comprises 6 REGs, of which one REG comprises 12 REs.

In one embodiment, the specific definition of the PDCCH candidate can be found in 3GPP TS 38.213, Section 10.

In one embodiment, the phrase "monitoring a control channel candidate" includes a meaning that: the monitoring refers to blind decoding, namely, receiving a signal on a control channel candidate and performing a decoding operation; if the decoding is determined as correct according to a Cyclic Redundancy Check (CRC) bit, it is determined that a control signaling is detected on the control channel candidate; otherwise, it is determined that no control signaling is detected on the control channel candidate.

In one embodiment, the phrase "monitoring a control channel candidate" includes a meaning that: the monitoring refers to coherent detection, namely, performing coherent reception on a control channel candidate and measuring energy of a signal obtained by the coherent reception; if the energy of the signal obtained by the coherent reception is larger than a first given threshold, it is determined that a control signaling is detected on the control channel candidate; otherwise, it is determined that no control signaling is detected on the control channel candidate.

In one embodiment, the phrase "monitoring a control channel candidate" includes a meaning that: the monitoring refers to energy detection, namely, sensing energy of radio signals on a control channel candidate and averaging to obtain a received energy; if the received energy is larger than a second given threshold, it is determined that a control signaling is detected on the control channel candidate; otherwise, it is determined that no control signaling is detected on the control channel candidate.

In one embodiment, the phrase "monitoring a control channel candidate" includes a meaning that: whether there is a control signaling to be transmitted on a control channel candidate is determined according to CRC.

In one embodiment, the phrase "monitoring a control channel candidate" includes a meaning that: whether there is a control signaling to be transmitted on a control channel candidate is not determined before determining whether decoding is correct according to CRC.

In one embodiment, the phrase "monitoring a control channel candidate" includes a meaning that: whether there is a control signaling to be transmitted on a control channel candidate is determined according to coherent detection.

In one embodiment, the phrase "monitoring a control channel candidate" includes a meaning that: whether there is a control signaling to be transmitted on a control channel candidate is not determined before coherent detection.

In one embodiment, the phrase "monitoring a control channel candidate" includes a meaning that: whether there is a control signaling to be transmitted on a control channel candidate is determined according to energy detection.

In one embodiment, the phrase "monitoring a control channel candidate" includes a meaning that: whether there is a control signaling to be transmitted on a control channel candidate is not determined before energy detection.

In one embodiment, when the first TCI state group comprises only one TCI state, the first signaling is used for indicating the first control channel candidate set.

In one embodiment, when the first TCI state group comprises only one TCI state, the first signaling is used for determining a first control resource set pool out of M control resource set pools, the first control resource set pool being one of the M control resource set pools, and the first control resource set pool being used to determine the first control channel candidate set.

In one embodiment, the sentence that "the first control resource set pool being used to determine the first control channel candidate set" means that: the first control channel candidate set comprises all control channel candidates in the S search space sets that belong to the first control resource set pool.

In one embodiment, the sentence that "the first control resource set pool being used to determine the first control channel candidate set" means that: the first control channel candidate set comprises partial control channel candidates in the S search space sets that belong to the first control resource set pool.

In one embodiment, any of the M control resource set pools comprises at least one control resource set.

In one embodiment, there exists at least one control channel candidate that satisfies a first condition in the S search space sets.

In one embodiment, a first condition comprises that: time-domain resources occupied are no earlier than the first time, and are associated with another control channel candidate in the S search space sets that is no earlier than the first time in time domain. In one embodiment, a given control channel candidate is any control channel candidate in the S search space sets by which time-domain resources occupied are no earlier than the first time; when the given control channel candidate is associated with another control channel candidate in the S search space sets, the given control channel candidate satisfies the first condition; when the given control channel candidate is not associated with any other control channel candidate in the S search space sets, the given control channel candidate does not satisfy the first condition.

In one embodiment, a first condition comprises that: time-domain resources occupied are no earlier than the first time, and are associated with another control channel candidate in the S search space sets that is earlier than or no earlier than the first time in time domain.

In one embodiment, a first condition comprises more than one sub-condition, where a first sub-condition is a sub-condition in the first condition; the first sub-condition comprises that: time-domain resources occupied are no earlier than the first time, and are associated with another control channel candidate in the S search space sets.

In one subembodiment, when there is one sub-condition in the first condition being satisfied, the first condition is satisfied; when each sub-condition in the first condition is not satisfied, the first condition is not satisfied.

In one subembodiment, when each sub-condition in the first condition is satisfied, the first condition is satisfied; when there is one sub-condition being unsatisfied in the first condition, the first condition is not satisfied.

In one subembodiment, a given control channel candidate is any control channel candidate in the S search space sets by which time-domain resources occupied are no earlier than the first time; when the given control channel candidate is associated with another control channel candidate in the S search space sets, the given control channel candidate satisfies the first sub-condition; when the given control channel candidate is not associated with any other control channel candidate in the S search space sets, the given control channel candidate does not satisfy the first sub-condition.

Embodiment 2

Figure 2:
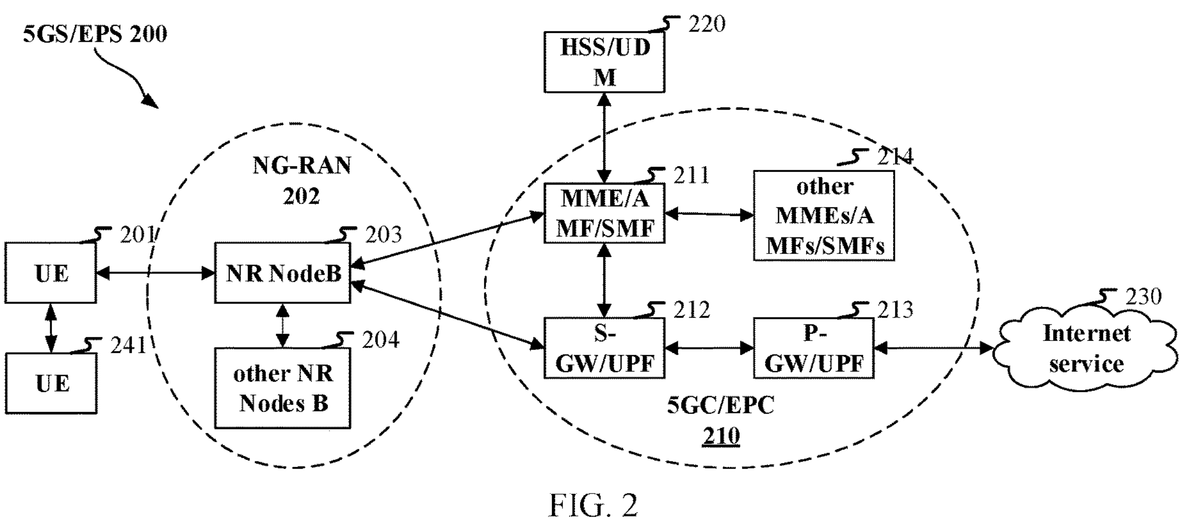
FIG. 2 illustrates a schematic diagram of a network architecture according to one embodiment of the present application.

Embodiment 2 illustrates a schematic diagram of a network architecture according to one embodiment of the present application, as shown in FIG. 2.

FIG. 2 is a diagram illustrating a network architecture of Long-Term Evolution (LTE), Long-Term Evolution Advanced (LTE-A) and future 5G systems. The LTE, or LTE-A or future 5G network architecture 200 may be called an Evolved Packet System (EPS) 200. The 5G NR or LTE network 200 can be called a 5G System/Evolved Packet System (5GS/EPS) 200 or other appropriate terms. The 5GS/EPS 200 may comprise one or more UEs 201, a UE 241 in sidelink communication with the UE(s) 201, an NG-RAN 202, a 5G CoreNetwork/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises a New Radio (NR) node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning System (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching (PS) services.

In one embodiment, the first node in the present application includes the UE 201.

In one embodiment, the second node in the present application includes the UE 241.

In one embodiment, the second node in the present application includes the gNB 203.

Embodiment 3

Figure 3:
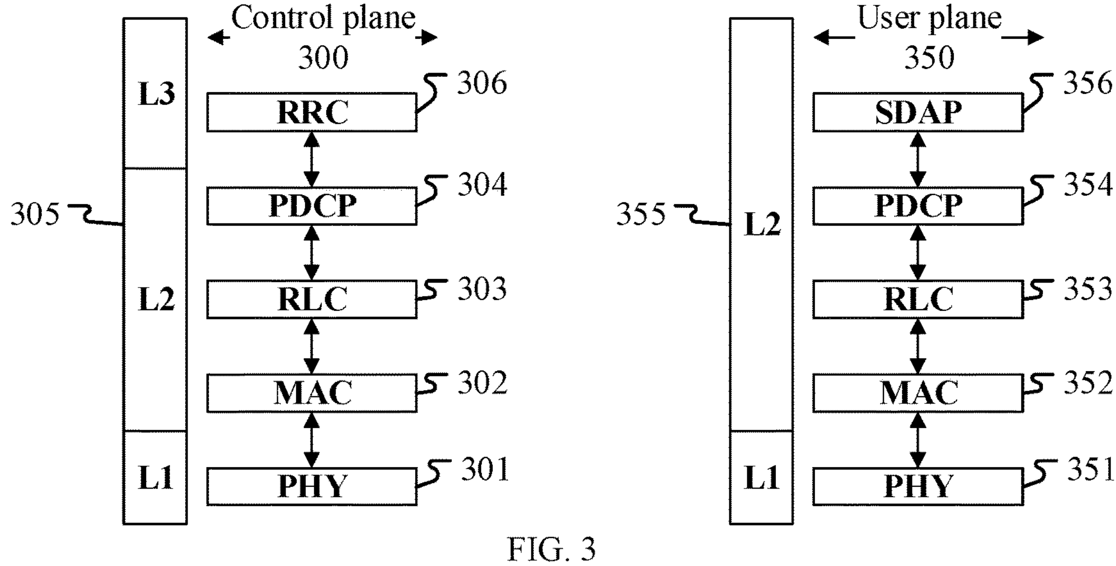
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to the present application, as shown in FIG. 3.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between the first communication node and the second communication node or between two UEs. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first signaling is generated by the PHY 301, or the PHY 351.

In one embodiment, the first information block is generated by the Radio Resource Control (RRC) sublayer 306.

In one embodiment, the first information block is generated by the MAC sublayer 302, or the MAC sublayer 352.

In one embodiment, the second information block is generated by the Radio Resource Control (RRC) sublayer 306.

In one embodiment, the second information block is generated by the MAC sublayer 302, or the MAC sublayer 352.

In one embodiment, the first signal is generated by the PHY 301, or the PHY 351.

In one embodiment, the second signal is generated by the PHY 301, or the PHY 351.

In one embodiment, the action of monitoring control channel candidates in S search space sets is generated by the PHY 301, or the PHY 351.

Embodiment 4

Figure 4:
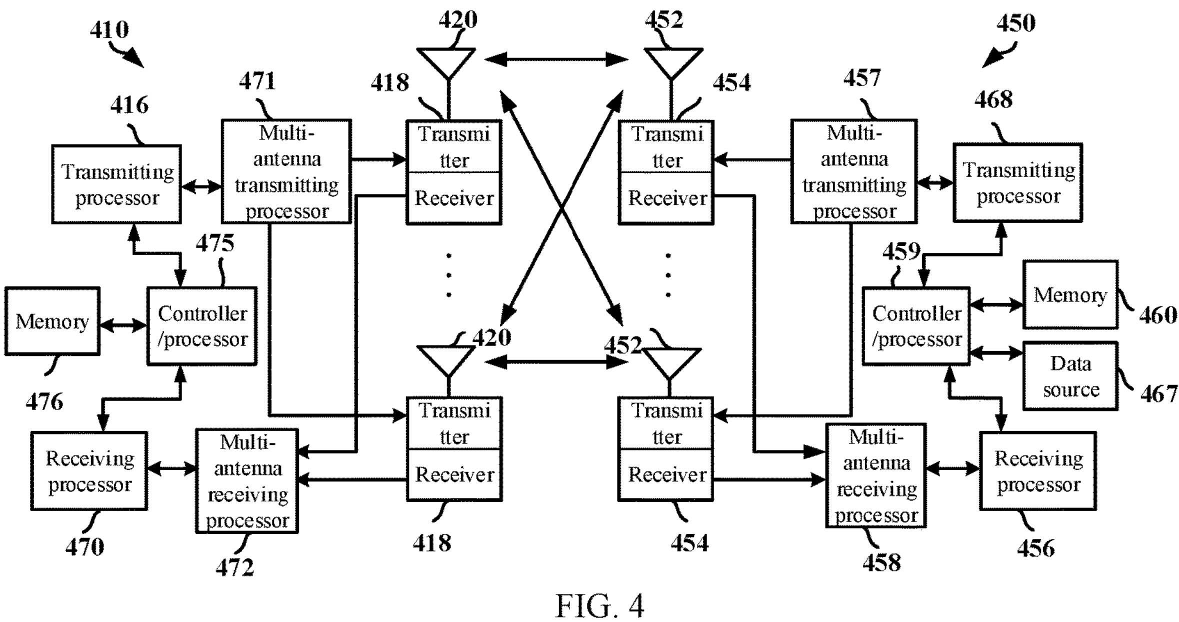
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In DL, the controller/processor 475 provides header compression, encryption, packet segmentation and reordering, multiplexing between a logical channel and a transport channel and radio resource allocation of the second communication device 450 based on various priorities. The controller/processor 475 is responsible for HARQ operation, retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the constellation mapping corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more parallel streams. The transmitting processor 416 then maps each parallel stream into a subcarrier. The modulated symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any parallel stream targeting the second communication device 450. Symbols on each parallel stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In DL transmission, the controller/processor 459 provides de-multiplexing between a transport channel and a logical channel, packet reassembling, decryption, header decompression, control signal processing so as to recover a higher-layer packet from the core network. The higher-layer packet is later provided to all protocol layers above the L2 layer. Or various control signals can be provided to the L3 for processing. The controller/processor 459 is also in charge of using ACK and/or NACK protocols for error detection as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL, the controller/processor 459 performs header compression, encryption, packet segmentation and reordering, and multiplexing between a logical channel and a transport channel based on radio resource allocation for the first communication device 410 so as to provide the L2 layer functions used for the user plane and the control plane. The controller/processor 459 is responsible for HARQ operation, retransmission of a lost packet and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated parallel streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 firstly converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450.

Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. The controller/processor 475 provides demultiplexing between a transport channel and a logical channel, packet reassembling, decryption, header decompression and control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory, the at least one memory comprises computer program codes; the at least one memory and the computer program codes are configured to be used in collaboration with the at least one processor. The second communication device 450 at least: receives a first information block; receives a first signaling; and monitors control channel candidates in S search space sets; herein, the first information block indicates S search space sets, S being a positive integer greater than 1; the first signaling comprises a first field, the first field in the first signaling determining a first Transmission Configuration Indicator (TCI) state group, the first TCI state group comprising at least one TCI state; the first signaling is used to determine a first time; starting from the first time, the first TCI state group is used for monitoring a first control channel candidate set; a number of TCI state(s) comprised by the first TCI state group is used to determine the first control channel candidate set in the S search space sets; when the first TCI state group comprises only one TCI state, the first control channel candidate set does not comprise any control channel candidate that satisfies a first condition in the S search space sets; the first condition comprises that time-domain resources occupied are no earlier than the first time, and are associated with another control channel candidate in the S search space sets.

In one embodiment, the second communication device 450 comprises a memory that stores a computer readable instruction program, the computer readable instruction program generates actions when executed by at least one processor, which include: receiving a first information block; receiving a first signaling; and monitoring control channel candidates in S search space sets; herein, the first information block indicates S search space sets, S being a positive integer greater than 1; the first signaling comprises a first field, the first field in the first signaling determining a first Transmission Configuration Indicator (TCI) state group, the first TCI state group comprising at least one TCI state; the first signaling is used to determine a first time; starting from the first time, the first TCI state group is used for monitoring a first control channel candidate set; a number of TCI state(s) comprised by the first TCI state group is used to determine the first control channel candidate set in the S search space sets; when the first TCI state group comprises only one TCI state, the first control channel candidate set does not comprise any control channel candidate that satisfies a first condition in the S search space sets; the first condition comprises that time-domain resources occupied are no earlier than the first time, and are associated with another control channel candidate in the S search space sets.

In one embodiment, the first communication device 410 comprises at least one processor and at least one memory, the at least one memory comprises computer program codes; the at least one memory and the computer program codes are configured to be used in collaboration with the at least one processor. The first communication device 410 at least: transmits a first information block; and transmits a first signaling; herein, the first information block indicates S search space sets, S being a positive integer greater than 1; the first signaling comprises a first field, the first field in the first signaling determining a first Transmission Configuration Indicator (TCI) state group, the first TCI state group comprising at least one TCI state; the first signaling is used to determine a first time; starting from the first time, the first TCI state group is used by a target receiver of the first signaling for monitoring a first control channel candidate set; a number of TCI state(s) comprised by the first TCI state group is used to determine the first control channel candidate set in the S search space sets; when the first TCI state group comprises only one TCI state, the first control channel candidate set does not comprise any control channel candidate that satisfies a first condition in the S search space sets; the first condition comprises that time-domain resources occupied are no earlier than the first time, and are associated with another control channel candidate in the S search space sets.

In one embodiment, the first communication device 410 comprises a memory that stores a computer readable instruction program, the computer readable instruction program generates actions when executed by at least one processor, which include: transmitting a first information block; and transmitting a first signaling; herein, the first information block indicates S search space sets, S being a positive integer greater than 1; the first signaling comprises a first field, the first field in the first signaling determining a first Transmission Configuration Indicator (TCI) state group, the first TCI state group comprising at least one TCI state; the first signaling is used to determine a first time; starting from the first time, the first TCI state group is used by a target receiver of the first signaling for monitoring a first control channel candidate set; a number of TCI state(s) comprised by the first TCI state group is used to determine the first control channel candidate set in the S search space sets; when the first TCI state group comprises only one TCI state, the first control channel candidate set does not comprise any control channel candidate that satisfies a first condition in the S search space sets; the first condition comprises that time-domain resources occupied are no earlier than the first time, and are associated with another control channel candidate in the S search space sets.

In one embodiment, the first node in the present application comprises the second communication device 450.

In one embodiment, the second node in the present application comprises the first communication device 410.

In one embodiment, at least one of the antenna 452, the receiver 454, the receiving processor 456, the multi-antenna receiving processor 458, the controller/processor 459, the memory 460 or the data source 467 is used to receive the first signaling in the present application; at least one of the antenna 420, the transmitter 418, the transmitting processor 416, the multi-antenna transmitting processor 471, the controller/processor 475 or the memory 476 is used to transmit the first signaling in the present application.

In one embodiment, at least one of the antenna 452, the receiver 454, the receiving processor 456, the multi-antenna receiving processor 458, the controller/processor 459, the memory 460 or the data source 467 is used to receive the first information block in the present application; at least one of the antenna 420, the transmitter 418, the transmitting processor 416, the multi-antenna transmitting processor 471, the controller/processor 475 or the memory 476 is used to transmit the first information block in the present application.

In one embodiment, at least one of the antenna 452, the receiver 454, the receiving processor 456, the multi-antenna receiving processor 458, the controller/processor 459, the memory 460 or the data source 467 is used to receive the second information block in the present application; at least one of the antenna 420, the transmitter 418, the transmitting processor 416, the multi-antenna transmitting processor 471, the controller/processor 475 or the memory 476 is used to transmit the second information block in the present application.

In one embodiment, at least one of the antenna 452, the receiver 454, the receiving processor 456, the multi-antenna receiving processor 458, the controller/processor 459, the memory 460 or the data source 467 is used to receive the second signal in the present application; at least one of the antenna 420, the transmitter 418, the transmitting processor 416, the multi-antenna transmitting processor 471, the controller/processor 475 or the memory 476 is used to transmit the second signal in the present application.

In one embodiment, at least one of the antenna 452, the receiver 454, the receiving processor 456, the multi-antenna receiving processor 458, the controller/processor 459, the memory 460 or the data source 467 is used for the action of monitoring control channel candidates in S search space sets in the present application.

In one embodiment, at least one of the antenna 452, the transmitter 454, the transmitting processor 468, the multi-antenna transmitting processor 457, the controller/processor 459 or the memory 460 is used to transmit the first signal in the present application; at least one of the antenna 420, the receiver 418, the receiving processor 470, the multi-antenna receiving processor 472, the controller/processor 475 or the memory 476 is used to receive the first signal in the present application.

Embodiment 5

Figures 5, 6:
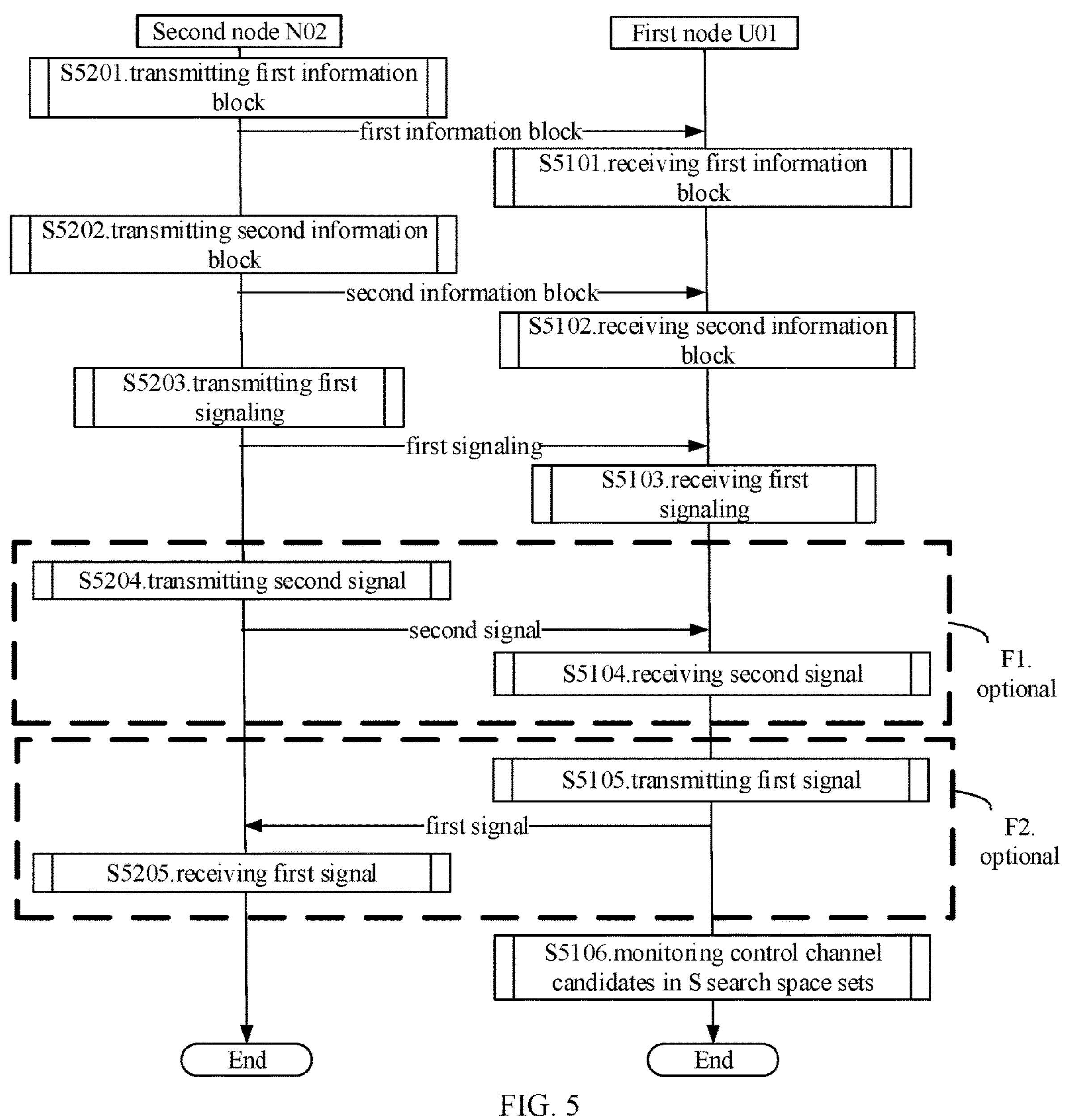
FIG. 5 illustrates a flowchart of transmission according to one embodiment of the present application.
FIG. 6 illustrates a schematic diagram of a relation between a first TCI state group and a first control channel candidate set according to one embodiment of the present application.

Embodiment 5 illustrates a flowchart of wireless transmission according to one embodiment of the present application, as shown in FIG. 5. In FIG. 5, a first node U01 and a second node N02 are respectively two communication nodes that transmit via an air interface. In FIG. 5, the boxes F1 and F2 are optional.

The first node U01 receives a first information block in step S5101; receives a second information block in step S5102; and receives a first signaling in step S5103; receives a second signal in step S5104; transmits a first signal in step S5105; and monitors control channel candidates in S search space sets in step S5106;

The second node N02 transmits a first information block in step S5201; transmits a second information block in step S5202; transmits a first signaling in step S5203; and transmits a second signal in step S5204; and receives a first signal in step S5205.

In Embodiment 5, the first information block indicates S search space sets, S being a positive integer greater than 1; the first signaling comprises a first field, the first field in the first signaling determining a first Transmission Configuration Indicator (TCI) state group, the first TCI state group comprising at least one TCI state; the first signaling is used to determine a first time; starting from the first time, the first TCI state group is used for monitoring a first control channel candidate set; a number of TCI state(s) comprised by the first TCI state group is used to determine the first control channel candidate set in the S search space sets; when the first TCI state group comprises only one TCI state, the first control channel candidate set does not comprise any control channel candidate that satisfies a first condition in the S search space sets; the first condition comprises that time-domain resources occupied are no earlier than the first time, and are associated with another control channel candidate in the S search space sets. The first signal comprises a HARQ-ACK associated with the first signaling. The first signaling comprises scheduling information of the second signal.

In one embodiment, the first field in the first signaling is used by the first node U01 to determine a first Transmission Configuration Indicator (TCI) state group.

In one embodiment, the first field in the first signaling is used by the second node N02 to determine a first Transmission Configuration Indicator (TCI) state group.

In one embodiment, the first signaling is used by the first node U01 to determine a first time.

In one embodiment, the first signaling is used by the second node N02 to determine a first time.

In one embodiment, the second information block indicates N TCI state groups; a value range of the first field includes N candidate values, the N candidate values respectively corresponding to the N TCI state groups, where the first TCI state group is one of the N TCI state groups that corresponds to a value of the first field in the first signaling; any of the N TCI state groups comprises at least one TCI state, N being a positive integer greater than 1; any of the N candidate values is a non-negative integer.

In one embodiment, the second information block indicates N TCI states; a value range of the first field includes N candidate values, and any candidate value of the N candidate values is a non-negative integer, N being a positive integer greater than 1; the N candidate values respectively correspond to N TCI states, where a reference TCI state is one of the N TCI states that corresponds to a value of the first field in the first signaling; the first TCI state group comprises the reference TCI state; whether the reference TCI state belongs to a reference TCI state set is used to determine the number of the TCI state(s) comprised by the first TCI state group; when the reference TCI state does not belong to the reference TCI state set, the number of the TCI state(s) comprised by the first TCI state group is equal to 1;

when the reference TCI state belongs to the reference TCI state set, the number of the TCI state(s) comprised by the first TCI state group is greater than 1.

In one subembodiment, whether the reference TCI state belongs to a reference TCI state set is used by the first node U01 to determine the number of TCI state(s) comprised by the first TCI state group.

In one subembodiment, whether the reference TCI state belongs to a reference TCI state set is used by the second node N02 to determine the number of TCI state(s) comprised by the first TCI state group.

In one embodiment, the second information block is transmitted earlier than the first information block.

In one embodiment, the second information block is transmitted later than the first information block.

In one embodiment, the second information block and the first information block are transmitted simultaneously.

In one embodiment, the second information block and the first information block belong to a same signaling.

In one embodiment, the second information block and the first information block belong to a same higher layer signaling.

In one embodiment, a reference search space set is any search space set among the S search space sets that does not comprise one control channel candidate in the first control channel candidate set, and a TCI state for transmissions on control channel candidates in the reference search space set remains unchanged before and after the first time.

In one embodiment, when the first TCI state group comprises M TCI states and M is a positive integer greater than 1, the first control channel candidate set comprises M control channel candidate subsets, starting from the first time, the M TCI states are respectively used for transmissions on the M control channel candidate subsets, any of the M control channel candidate subsets comprising at least one control channel candidate.

In one embodiment, a value range of the first field includes N candidate values, and any candidate value of the N candidate values is a non-negative integer, N being a positive integer greater than 1; the N candidate values respectively correspond to N TCI states, where the first TCI state group comprises one of the N TCI states that corresponds to a value of the first field in the first signaling; whether the value of the first field in the first signaling belongs to a first candidate value set is used to determine the number of TCI state(s) comprised by the first TCI state group; when the value of the first field in the first signaling does not belong to the first candidate value set, the number of the TCI state(s) comprised by the first TCI state group is equal to 1; when the value of the first field in the first signaling belongs to the first candidate value set, the number of the TCI state(s) comprised by the first TCI state group is greater than 1.

In one subembodiment, whether the value of the first field in the first signaling belongs to a first candidate value set is used by the first node U01 to determine the number of TCI state(s) comprised by the first TCI state group.

In one subembodiment, whether the value of the first field in the first signaling belongs to a first candidate value set is used by the second node N02 to determine the number of TCI state(s) comprised by the first TCI state group.

In one subembodiment, the first candidate value set is configured by a higher layer parameter.

In one subembodiment, the first candidate value set is pre-defined.

In one embodiment, the phrase that "two control channel candidates are associated" includes a meaning that: the first node assumes that the two control channel candidates carry identical DCIs.

In one embodiment, the phrase that "two control channel candidates are not associated" includes a meaning that: the first node cannot assume that the two control channel candidates carry identical DCIs.

In one embodiment, the phrase that "two control channel candidates are associated" includes a meaning that: search space sets to which the two control channel candidates respectively belong are associated, where indexes of the two control channel candidates respectively in the search space sets to which these control channel candidates belong are identical.

In one embodiment, the phrase that "two control channel candidates are not associated" includes a meaning that: search space sets to which the two control channel candidates respectively belong are associated, where indexes of the two control channel candidates respectively in the search space sets to which these control channel candidates belong are different.

In one embodiment, the phrase that "two control channel candidates are not associated" includes a meaning that: search space sets to which the two control channel candidates respectively belong are not associated.

In one embodiment, an index of a control channel candidate in a search space set to which the control channel candidate belongs is an index of the control channel candidate among all control channel candidates comprised by the search space set to which the control channel candidate belongs.

In one embodiment, an index of a control channel candidate in a search space set to which the control channel candidate belongs is an index of the control channel candidate among all control channel candidates for an aggregation level (AL) of the control channel candidate comprised by the search space set to which the control channel candidate belongs.

In one embodiment, the phrase that "two search space sets are associated" includes a meaning that: for each Aggregation Level (AL), numbers of control channel candidates respectively comprised by the two search space sets are equal.

In one embodiment, the phrase that "two search space sets are not associated" includes a meaning that: for at least one Aggregation Level (AL) that exists, numbers of control channel candidates respectively comprised by the two search space sets are unequal.

In one embodiment, the phrase that "two search space sets are associated" includes a meaning that: configuration information of one search space set of the two search space sets comprises an index of the other of the two search space sets.

In one embodiment, the phrase that "two search space sets are not associated" includes a meaning that: configuration information of any search space set of the two search space sets does not comprise an index of the other of the two search space sets.

In one embodiment, the phrase that "two search space sets are associated" includes a meaning that: a higher layer parameter indicates that the two search space sets are associated.

In one embodiment, the phrase that "two search space sets are not associated" includes a meaning that: there exists no higher layer parameter indicating that the two search space sets are associated.

In one embodiment, the phrase that "two control channel candidates are associated" includes a meaning that: search space sets to which the two control channel candidates respectively belong are of a same type.

In one embodiment, a type of a search space set is UE-specific search space (USS) or Common search space (CSS).

In one embodiment, the phrase that "two control channel candidates are associated" includes a meaning that: search space sets to which the two control channel candidates respectively belong are in a same DCI format.

In one embodiment, the phrase that "two control channel candidates are associated" includes a meaning that: the two control channel candidates have a same aggregation level (AL).

In one embodiment, the phrase that "two control channel candidates are associated" includes a meaning that: for each Aggregation Level (AL), numbers of control channel candidates respectively comprised by search space sets to which the two control channel candidates respectively belong are equal.

In one embodiment, the phrase that "two control channel candidates are associated" includes a meaning that: the two control channel candidates have a same candidate index.

In one embodiment, the phrase that "two control channel candidates are associated" includes a meaning that: the two control channel candidates have identical scrambling.

In one embodiment, the sentence that "the two control channel candidates have identical scrambling" includes the following meaning: scrambling sequences of PDCCHs respectively carried by the two control channel candidates are identical.

In one embodiment, the sentence that "the two control channel candidates have identical scrambling" includes the following meaning: a first scrambling sequence and a second scrambling sequence are respectively scrambling sequences of PDCCHs carried by the two control channel candidates, where elements in the first scrambling sequence and elements in the second scrambling sequence are the same in one-to-one correspondence.

In one embodiment, the sentence that "the two control channel candidates have identical scrambling" includes the following meaning: a first scrambling sequence and a second scrambling sequence are respectively scrambling sequences of PDCCHs carried by the two control channel candidates, where an initial value of a Generator for the first scrambling sequence and an initial value of a Generator for the second scrambling sequence are the same.

In one embodiment, the sentence that "the two control channel candidates have identical scrambling" includes the following meaning: the first node in the present application assumes that the two control channel candidates have identical scrambling.

In one embodiment, the sentence that "the two control channel candidates have identical scrambling" includes the following meaning: a first scrambling sequence and a second scrambling sequence are respectively scrambling sequences of PDCCHs carried by the two control channel candidates, where an initial value of a generating register for the first scrambling sequence and an initial value of a generating register for the second scrambling sequence are the same.

In one embodiment, the sentence that "the two control channel candidates have identical scrambling" includes the following meaning: a first scrambling sequence and a second scrambling sequence are respectively scrambling sequences of PDCCHs carried by the two control channel candidates, where the first scrambling sequence and the second scrambling sequence are generated by a same Gold Sequence with the length of 31 using a same initial value of a Generator.

In one embodiment, the phrase that "two control channel candidates are associated" includes a meaning that: sizes of formats of DCIs respectively carried by the two control channel candidates are the same.

In one embodiment, the sentence that "sizes of formats of DCIs respectively carried by the two control channel candidates are the same" includes the following meaning: the first node in the present application assumes that sizes of formats of DCIs respectively carried by the two control channel candidates are the same.

In one embodiment, the sentence that "sizes of formats of DCIs respectively carried by the two control channel candidates are the same" includes the following meaning: sizes of DCI Payloads respectively carried by the two control channel candidates are the same.

In one embodiment, the sentence that "sizes of formats of DCIs respectively carried by the two control channel candidates are the same" includes the following meaning: numbers of bits respectively comprised in formats of DCIs respectively carried by the two control channel candidates are equal.

In one embodiment, the sentence that "sizes of formats of DCIs respectively carried by the two control channel candidates are the same" includes the following meaning: numbers of bits respectively comprised in DCI Payloads respectively carried by the two control channel candidates are equal.

In one embodiment, the phrase that "DCI carried by a control channel candidate" includes the following meaning: DCI that the first node in the present application assumes to be carried by a control channel candidate.

In one embodiment, the phrase that "DCI carried by a control channel candidate" includes the following meaning: DCI that a control channel candidate actually carries.

In one embodiment, a Format of DCI in a control channel candidate is one of 0_1, 0_2, 0_3, 1_1, 1_2 or 1_3.

In one embodiment, a Format of DCI in a control channel candidate is one of 1_1, 1_2 or 1_3.

In one embodiment, a Format of DCI in a control channel candidate is one of DCI Formats that can be supported.

In one embodiment, a Format of DCI in a control channel candidate is one of DCI Formats that are supported by a UE-Specific Search Space Set (USS set).

In one embodiment, the phrase that "two control channel candidates are associated" includes a meaning that: the two control channel candidates belong to different control resource sets.

In one embodiment, the phrase that "two control channel candidates are associated" includes a meaning that: time-domain resources respectively indicated by DCIs carried by the two control channel candidates are overlapped.

In one embodiment, the phrase that "two control channel candidates are associated" includes a meaning that: time-domain resources respectively indicated by DCIs carried by the two control channel candidates are fully overlapped.

In one embodiment, the phrase that "two control channel candidates are associated" includes a meaning that: time-domain resources indicated by DCIs respectively carried by the two control channel candidates both comprise time-domain resources occupied by a same signal.

In one embodiment, the phrase that "two control channel candidates are associated" includes a meaning that: DCIs respectively carried by the two control channel candidates are used for scheduling a same signal.

In one embodiment, the phrase that "DCIs respectively carried by the two control channel candidates are used for scheduling a same signal" includes the following meaning: the first node in the present application assumes that DCIs respectively carried by the two control channel candidates are used for scheduling a same signal.

In one embodiment, the phrase that "two control channel candidates are associated" includes a meaning that: DCIs respectively carried by the two control channel candidates are used for scheduling a same Transport Block (TB).

In one embodiment, the phrase that "two control channel candidates are associated" includes a meaning that: the first node in the present application assumes that DCIs respectively carried by the two control channel candidates are used for scheduling a same Transport Block (TB).

In one embodiment, the phrase that "two control channel candidates are associated" includes a meaning that: DCIs respectively carried by the two control channel candidates are two repetitions of a same DCI.

In one embodiment, the phrase that "two control channel candidates are associated" includes a meaning that: the first node assumes that DCIs respectively carried by the two control channel candidates are two repetitions of a same DCI.

In one embodiment, the phrase that "two control channel candidates are associated" includes a meaning that: DCIs respectively carried by the two control channel candidates are two pieces of independent scheduling information of a same Transport Block (TB).

In one embodiment, the phrase that "two control channel candidates are associated" includes the following meaning: DCIs respectively carried by the two control channel candidates are two transmissions in Multi-Chance transmissions of scheduling information of a same Transport Block (TB).

In one embodiment, the phrase that "two control channel candidates are associated" includes the following meaning: the first node assumes that DCIs respectively carried by the two control channel candidates are two transmissions in Multi-Chance transmissions of scheduling information of a same Transport Block (TB).

In one embodiment, the phrase that "two control channel candidates are associated" includes the following meaning: indexes of the two control channel candidates are associated.

In one embodiment, the phrase that "two control channel candidates are associated" includes the following meaning: there is a mapping relationship between indexes of the two control channel candidates.

In one embodiment, the phrase that "two control channel candidates are associated" includes the following meaning: there is a function-based relationship between indexes of the two control channel candidates.

In one embodiment, the phrase that "two control channel candidates are associated" includes the following meaning: CCEs respectively occupied by the two control channel candidates are associated.

In one embodiment, the first signal is transmitted on a PUCCH resource.

In one embodiment, the first time is after an end time of the first signal.

In one embodiment, the first time is later than an end time of the first signal.

In one embodiment, transmission of the first signal is used to determine that the first TCI state group is used for monitoring a first control channel candidate set from the first time.

In one embodiment, the sentence that "transmission of the first signal is used to determine that the first TCI state group is used for monitoring a first control channel candidate set from the first time" means that: after transmitting the first signal, the first node starts to monitor a first control channel candidate set using the first TCI state group from the first time.

In one embodiment, the sentence that "transmission of the first signal is used to determine that the first TCI state group is used for monitoring a first control channel candidate set from the first time" means that: after receiving the first signal, a target receiver of the first signal starts to transmit a first control channel candidate set using the first TCI state group from the first time.

In one embodiment, the sentence that "transmission of the first signal is used to determine that the first TCI state group is used for monitoring a first control channel candidate set from the first time" means that: after receiving the first signal, a target receiver of the first signal assumes that the first node monitors a first control channel candidate set using the first TCI state group from the first time.

In one embodiment, the sentence that "transmission of the first signal is used to determine that the first TCI state group is used for monitoring a first control channel candidate set from the first time" means that: after receiving the first signal, a target receiver of the first signal assumes that the first TCI state group is used by the first node for monitoring a first control channel candidate set when transmitting a signaling on the first control channel candidate set from the first time.

In one embodiment, the HARQ-ACK associated with the first signaling includes an ACKnowledgement (ACK).

In one embodiment, the HARQ-ACK associated with the first signaling includes a Negative ACKnowledgement (NACK).

In one embodiment, the first signaling comprises scheduling information of the second signal, the HARQ-ACK associated with the first signaling being a HARQ-ACK for the second signal.

In one embodiment, the HARQ-ACK associated with the first signaling is a HARQ-ACK for the first signaling.

In one embodiment, the first signaling comprises scheduling information of the second signal, the HARQ-ACK associated with the first signaling indicating that the second signal is correctly received.

In one embodiment, the HARQ-ACK associated with the first signaling is used to determine that the first signaling is correctly received.

In one embodiment, the HARQ-ACK associated with the first signaling indicates that the first signaling is correctly received.

In one embodiment, a HARQ-ACK for the second signal indicates whether the second signal is correctly received.

In one embodiment, a HARQ-ACK for the second signal indicates that the second signal is correctly received.

In one embodiment, a HARQ-ACK for the second signal indicates that the second signal is incorrectly received.

In one embodiment, a HARQ-ACK for the first signaling indicates whether the first signaling is correctly received.

In one embodiment, a HARQ-ACK for the first signaling indicates that the first signaling is correctly received.

In one embodiment, a HARQ-ACK for the first signaling indicates that the first signaling is incorrectly received.

In one embodiment, the first signaling indicates time-frequency resources occupied by the first signal.

In one embodiment, the first signaling indicates a Physical Uplink Control CHannel (PUCCH) resource occupied by the first signal.

In one embodiment, the second signal comprises a PDSCH transmission.

In one embodiment, the second signal carries a first bit block, the first bit block comprising at least one bit.

In one embodiment, the first bit block comprises one TB.

In one embodiment, the first bit block comprises at least one TB.

In one embodiment, the first bit block comprises a Code block group (CBG).

In one embodiment, the first bit block comprises at least one CBG.

In one embodiment, scheduling information of the second signal comprises: at least one of time-domain resources occupied, frequency-domain resources occupied, a Modulation and Coding Scheme (MCS), configuration information of DeModulation Reference Signals (DMRS), a Hybrid Automatic Repeat reQuest (HARQ) process ID, a Redundancy Version (RV), a New Data Indicator (NDI), a transmission antenna port, an SRS resource indication, precoding information or a number of layers.

Embodiment 6

Embodiment 6 illustrates a schematic diagram of a relation between a first TCI state group and a first control channel candidate set according to one embodiment of the present application; as shown in FIG. 6.

In Embodiment 6, the first signaling is used to determine a first time; starting from the first time, the first TCI state group is used for monitoring a first control channel candidate set.

In one embodiment, starting from the first time, the first TCI state group is used for monitoring only the first control channel candidate set in the S search space sets.

In one embodiment, starting from the first time, the first node drops monitoring all control channel candidates that satisfy the first condition in the S search space sets.

In one embodiment, when the first TCI state group comprises only one TCI state, the first node drops monitoring all control channel candidates that satisfy the first condition in the S search space sets from the first time.

In one embodiment, before the first time a second TCI state group is used for monitoring a second control channel candidate set, the second control channel candidate set belonging to one or more same search space sets as the first control channel candidate set; the second TCI state group is different from the first TCI state group.

In one subembodiment, time-domain resources occupied by any control channel candidate in the second control channel candidate set are earlier than the first time.

In one subembodiment, the second TCI state group comprises at least one TCI state.

In one subembodiment, the second TCI state group comprises one or two TCI states.

In one subembodiment, a number of TCI state(s) comprised by the second TCI state group is equal to a number of TCI state(s) comprised by the first TCI state group.

In one embodiment, the phrase "starting from the first time" refers to being no earlier than the first time.

In one embodiment, the phrase "starting from the first time" refers to including the first time and being later than the first time.

In one embodiment, the phrase "before the first time" refers to being earlier than the first time.

In one embodiment, time-domain resources occupied by any control channel candidate in the first control channel candidate set are no earlier than the first time.

In one embodiment, time-domain resources occupied by at least one control channel candidate in the first control channel candidate set are no earlier than the first time, and time-domain resources occupied by at least one control channel candidate in the first control channel candidate set are earlier than the first time.

In one embodiment, the meaning of "a given TCI state being used for monitoring a given control channel candidate" includes: a given TCI state is used for monitoring a given search space set, the given search space set comprising a given control channel candidate.

In one embodiment, the meaning of "a given TCI state being used for monitoring a given control channel candidate" includes: a given TCI state is used for monitoring a control resource set associated with a given search space set, the given search space set comprising a given control channel candidate.

In one embodiment, the meaning of "a given TCI state being used for monitoring a given control channel candidate" includes: a given TCI state is a TCI state of a given control channel candidate.

In one embodiment, the meaning of "a given TCI state being used for monitoring a given control channel candidate" includes: a given TCI state is used to determine an antenna port QCL parameter of a given control channel candidate.

In one embodiment, the meaning of "a given TCI state being used for monitoring a given control channel candidate" includes: a given TCI state is used to determine an antenna port QCL parameter of PDCCH DeModulation Reference Signals (DMRS) on a given control channel candidate.

In one embodiment, the meaning of "a given TCI state being used for monitoring a given control channel candidate" includes: a given TCI state is used for monitoring a PDCCH DMRS on a given control channel candidate.

In one embodiment, the given TCI state belongs to the first TCI state group, and the given control channel candidate is any control channel candidate in the first control channel candidate set.

In one embodiment, the given TCI state belongs to the second TCI state group, and the given control channel candidate is any control channel candidate in the second control channel candidate set.

In one embodiment, the given control channel candidate is any control channel candidate in the S search space sets.

In one embodiment, the QCL refers to being Quasi Co-Located.

In one embodiment, the QCL refers to Quasi Co-Location.

In one embodiment, a type of the QCL parameter includes QCL-TypeD.

In one embodiment, for the specific definition of the QCL-TypeD, refer to 3GPP TS38.214, Section 5.1.5.

In one embodiment, the QCL parameter comprises a Spatial Rx parameter.

In one embodiment, the QCL parameter comprises a Spatial Domain Filter.

In one embodiment, the sentence that "a given TCI state is used to determine an antenna port QCL parameter of a given control channel candidate" includes a meaning that: the first node assumes that a transmission antenna port of a given control channel candidate is Quasi Co-Located (QCL) with one or more reference signals indicated by a given TCI state.

In one embodiment, the sentence that "a given TCI state is used to determine an antenna port QCL parameter of a given control channel candidate" includes a meaning that:

the first node assumes that a DMRS antenna port associated with reception of control channel in a given control channel candidate is QCL with one or more reference signals indicated by a given TCI state.

In one embodiment, the sentence that "a given TCI state is used to determine an antenna port QCL parameter of a given control channel candidate" includes a meaning that: the first node receives a reference signal indicated by a given TCI state and monitors a control channel in a given control channel candidate using a same QCL parameter.

In one embodiment, the sentence that "a given TCI state is used to determine an antenna port QCL parameter of a given control channel candidate" includes a meaning that: the first node receives a reference signal indicated by a given TCI state and monitors a control channel in a given control channel candidate using a same spatial domain filter.

In one embodiment, the sentence that "a given TCI state is used to determine an antenna port QCL parameter of a given control channel candidate" includes a meaning that: the first node transmits a reference signal indicated by a given TCI state and monitors control channel(s) in a control resource set associated with the given search space set using a same QCL parameter.

In one embodiment, the sentence that "a given TCI state is used to determine an antenna port QCL parameter of a given control channel candidate" includes a meaning that: the first node transmits a reference signal indicated by a given TCI state and monitors control channel(s) in a control resource set associated with the given search space set using a same spatial domain filter.

In one embodiment, the control channel is a physical layer control channel.

In one embodiment, the control channel is a PDCCH.

In one embodiment, a control resource set comprises multiple REs.

In one embodiment, a control resource set comprises at least one CCE.

In one embodiment, a control resource set is a Control Resource Set (CORESET).

In one embodiment, an index of a control resource set is configured by a parameter controlResourceSetId.

In one embodiment, a control resource set is configured by an Information Element (IE) ControlResourceSet in an RRC signaling.

In one embodiment, the specific definition of the CORESET can be found in 3GPP TS 38.213, Section 10.

In one embodiment, the specific definition of the IE ControlResourceSet can be found in 3GPP TS 38.331, Section 6.3.2.

Embodiment 7

Embodiment 7 illustrates a schematic diagram of a relation between a first TCI state group and a first control channel candidate set according to another embodiment of the present application; as shown in FIG. 7.

In Embodiment 7, when the first TCI state group comprises M TCI states and M is a positive integer greater than 1, the first control channel candidate set comprises M control channel candidate subsets, starting from the first time, the M TCI states are respectively used for monitoring the M control channel candidate subsets, any of the M control channel candidate subsets comprising at least one control channel candidate.

In one embodiment, that "a TCI state is used for monitoring a control channel candidate subset" means that: the TCI state is used for monitoring each control channel candidate in the control channel candidate subset.

In one subembodiment, the control channel candidate subset comprises at least one control channel candidate.

In one subembodiment, the TCI state is one of the M TCI states, and the control channel candidate subset is one of the M control channel candidate subsets.

In one embodiment, M is equal to 2.

In one embodiment, M is greater than 2.

In one embodiment, the M TCI states are respectively used for monitoring control channel candidates in M control resource set pools, the M control channel candidate subsets respectively belonging to the M control resource set pools.

In one embodiment, the M TCI states are respectively used for monitoring control channel candidates in M control resource set pools, the M control channel candidate subsets respectively comprising control channel candidates in the first control channel candidate set that respectively belong to the M control resource set pools.

In one embodiment, the M TCI states are respectively used for monitoring control channel candidates in M control resource set pools; the M control channel candidate subsets respectively belong to the M control resource set pools; a given control resource set pool is any control resource set pool among the M control resource set pools; a given control channel candidate subset is one of the M control channel candidate subsets that belongs to the given control resource set pool; the given control channel candidate subset comprises all control channel candidates in the first control channel candidate set that belong to the given control resource set pool.

In one embodiment, the M TCI states are respectively used for monitoring control channel candidates in M control resource set pools, where a control resource set associated with any of the S search space sets belongs to a control resource set pool among the M control resource set pools.

In one embodiment, any control resource set pool among the M control resource set pools is associated with one of the S search space sets.

In one embodiment, that "a control channel candidate belongs to a control resource set" means that: the control channel candidate belongs to the control resource set in frequency domain.

In one embodiment, that "a control channel candidate belongs to a control resource set" means that: the control resource set is a control resource set associated with a search space set to which the control channel candidate belongs.

In one embodiment, that "a control channel candidate belongs to a control resource set" means that: the control channel candidate is made up of at least one Control Channel Element (CCE) in the control resource set.

In one embodiment, that "a control channel candidate subset belongs to a control resource set pool" means that: a control resource set to which any control channel candidate in the control channel candidate subset belongs belongs to the control resource set pool.

In one embodiment, that "a control channel candidate subset belongs to a control resource set pool" means that: a control resource set to which any control channel candidate in the control channel candidate subset belongs belongs to a control resource set in the control resource set pool.

In one embodiment, the control channel candidate subset is one of the M control channel candidate subsets, and the control resource set pool is one of the M control resource set pools.

In one embodiment, a control resource set pool comprises at least one control resource set.

In one embodiment, the phrase that "a control resource set associated with a search space set" includes a meaning that: any control channel candidate in a search space set consists of at least one CCE in a control resource set associated with the search space set.

In one embodiment, the phrase that "a control resource set associated with a search space set" includes a meaning that: a control resource set associated with a search space set is used to determine time-frequency resources occupied by the search space set in a Monitoring Occasion.

In one embodiment, the phrase that "a control resource set associated with a search space set" includes a meaning that: a number of Resource Elements (REs) occupied by a search space set in a Monitoring Occasion is a number of REs occupied by a control resource set associated with the search space set.

In one embodiment, the phrase that "a control resource set associated with a search space set" includes a meaning that: a number of Resource Blocks (RBs) occupied by a search space set in frequency domain is a number of RBs occupied by a control resource set associated with the search space set in frequency domain.

In one embodiment, the phrase that "a control resource set associated with a search space set" includes a meaning that: frequency-domain resources occupied by a search space set are frequency-domain resources occupied by a control resource set associated with the search space set.

In one embodiment, the phrase that "a control resource set associated with a search space set" includes a meaning that: a number of symbols occupied by a control resource set associated with a search space set is used to determine a number of symbols occupied by the search space set in a Monitoring Occasion.

In one embodiment, the phrase that "a control resource set associated with a search space set" includes a meaning that: a number of symbols occupied by a search space set in a Monitoring Occasion is a number of symbols occupied by a control resource set associated with the search space set.

In one embodiment, the phrase that "a control resource set associated with a search space set" includes a meaning that: configuration information of a search space set comprises an index of a control resource set associated with the search space set.

In one embodiment, a said Monitoring Occasion comprises a time duration.

In one embodiment, a said Monitoring Occasion comprises at least one symbol.

In one embodiment, a said Monitoring Occasion comprises a slot.

In one embodiment, a said Monitoring Occasion comprises a sub-slot.

In one embodiment, a said Monitoring Occasion comprises a subframe.

Embodiment 8

Embodiment 8 illustrates a schematic diagram of a first signaling being used to determine a first time according to one embodiment of the present application; as shown in FIG. 8.

In one embodiment, time-domain resources occupied by the first signaling are no later than the first time.

In one embodiment, time-domain resources occupied by the first signaling are earlier than the first time.

In one embodiment, the first time is a start time of a time unit.

In one embodiment, the meaning of the phrase that "the first signaling being used to determine a first time" includes: the first signaling indicates the first time.

In one embodiment, the meaning of the phrase that "the first signaling being used to determine a first time" includes: time-domain resources occupied by the first signaling are used to determine a first time.

In one embodiment, the meaning of the phrase that "the first signaling being used to determine a first time" includes: the first signaling comprises scheduling information of a second signal, time-domain resources occupied by the second signal being used to determine the first time.

In one embodiment, the meaning of the phrase that "the first signaling being used to determine a first time" includes: the first signaling indicates time-frequency resources occupied by a first signal, the first signal carrying a HARQ-ACK associated with the first signaling; time-domain resources occupied by the first signal are used to determine a first time.

In one embodiment, the sentence that "time-domain resources occupied by a given signal are used to determine a first time" includes a meaning that: a first time unit is a first one of time units following at least a first interval value after the given signal, with the first time belonging to the first time unit.

In one embodiment, the phrase that "a first time unit is a first one of time units following at least a first interval value after a given signal" means that: a first time unit is an earliest time unit which is later than the given signal in time and between which and the given signal a time interval is at least the first interval value.

In one embodiment, the phrase that "a first time unit is a first one of time units following at least a first interval value after a given signal" means that: a first time unit is an earliest time unit which is later than the given signal in time and between which and the given signal a time interval is equal to the first interval value.

In one embodiment, the phrase that "a time unit is later than the given signal in time" means that: a start time of the time unit is later than an end time of the given signal.

In one embodiment, the phrase that "a time unit is later than the given signal in time" means that: any time in the time unit is later than an end time of the given signal.

In one embodiment, the phrase that "a time unit is later than the given signal in time" means that: a start time of the time unit is later than a start time of the given signal.

In one embodiment, the phrase "a time interval between a time unit and the given signal" means: a time offset between a start time of the time unit and an end time of the given signal.

In one embodiment, the phrase "a time interval between a time unit and the given signal" means: a time offset between a start time of the time unit and a start time of the given signal.

In one embodiment, the phrase "after the given signal" means: being later than the given signal in time.

In one embodiment, the phrase "after the given signal" means: being later than an end time of the given signal in time.

In one embodiment, the phrase "after the given signal" means: being later than a start time of the given signal in time.

In one embodiment, the phrase of "the first time belonging to the first time unit" means that: the first time is a start time of the first time unit.

In one embodiment, the phrase of "the first time belonging to the first time unit" means that: the first time is an end time of the first time unit.

In one embodiment, the sentence that "time-domain resources occupied by a given signal are used to determine a first time" includes a meaning that: time-domain resources occupied by the given signal are used to determine a reference time unit, and a first time unit is a first one of time units following at least a first interval value after the reference time unit, with the first time belonging to the first time unit.

In one embodiment, the phrase that "time-domain resources occupied by the given signal are used to determine a reference time unit" means that: a reference time unit is a time unit comprising time-domain resources occupied by the given signal.

In one embodiment, the phrase that "time-domain resources occupied by the given signal are used to determine a reference time unit" means that: a reference time unit is a time unit comprising an end time of the given signal.

In one embodiment, the phrase that "time-domain resources occupied by the given signal are used to determine a reference time unit" means that: a reference time unit is a time unit comprising a start time of the given signal.

In one embodiment, the phrase that "time-domain resources occupied by the given signal are used to determine a reference time unit" means that: a reference time unit is a time unit later than a time unit comprising time-domain resources occupied by the given signal in time.

In one embodiment, the phrase that "a first time unit is a first one of time units following at least a first interval value after the reference time unit" means that: a first time unit is an earliest time unit which is later than the reference time unit in time and between which and the reference time unit a time interval is at least the first interval value.

In one embodiment, the phrase that "a first time unit is a first one of time units following at least a first interval value after the reference time unit" means that: a first time unit is an earliest time unit which is later than the reference time unit in time and between which and the reference time unit a time interval is equal to the first interval value.

In one embodiment, the phrase that "a time unit is later than the reference time unit in time" means that: a start time of the time unit is later than an end time of the reference time unit.

In one embodiment, the phrase that "a time unit is later than the reference time unit in time" means that: any time in the time unit is later than an end time of the reference time unit.

In one embodiment, the phrase that "a time unit is later than the reference time unit in time" means that: a start time of the time unit is later than a start time of the reference time unit.

In one embodiment, the phrase "a time interval between a time unit and the reference time unit" means: a time offset between a start time of the time unit and an end time of the reference time unit.

In one embodiment, the phrase "a time interval between a time unit and the reference time unit" means: a time offset between a start time of the time unit and a start time of the reference time unit.

In one embodiment, the phrase "after the reference time unit" means: being later than the reference time unit in time.

In one embodiment, the phrase "after the reference time unit" means: being later than an end time of the reference time unit in time.

In one embodiment, the phrase "after the reference time unit" means: being later than a start time of the reference time unit in time.

In one embodiment, the sentence that "time-domain resources occupied by a given signal are used to determine a first time" includes a meaning that: time-domain resources occupied by the given signal are used to determine a first reference time; the first reference time is used together with a first interval value to determine the first time.

In one embodiment, the sentence that "time-domain resources occupied by the given signal are used to determine a first reference time" means that: the first reference time is an end time of the given signal.

In one embodiment, the sentence that "time-domain resources occupied by the given signal are used to determine a first reference time" means that: the first reference time is a start time of the given signal.

In one embodiment, the sentence that "time-domain resources occupied by the given signal are used to determine a first reference time" means that: the first reference time is an end time of a time unit comprising time-domain resources occupied by the given signal.

In one embodiment, the sentence that "time-domain resources occupied by the given signal are used to determine a first reference time" means that: the first reference time is an end time of a time unit comprising an end time of the given signal.

In one embodiment, the sentence that "the first reference time is used together with a first interval value to determine the first time" means that: the first time is later than the first reference time, and a time offset between the first time and the first reference time is equal to the first time.

In one embodiment, the sentence that "the first reference time is used together with a first interval value to determine the first time" means that: the first time is later than the first reference time, and the first time is a start time of an earliest time unit between which and the first reference time a time offset is no smaller than a first interval value.

In one embodiment, the sentence that "the first reference time is used together with a first interval value to determine the first time" means that: the first time is later than the first reference time, and the first time is an end time of an earliest time unit between which and the first reference time a time offset is no smaller than a first interval value.

In one embodiment, the given signal is the first signaling.

In one embodiment, the given signal is the first signal.

In one embodiment, the given signal is the second signal.

In one embodiment, a said time unit is a slot.

In one embodiment, a said time unit is a sub-slot.

In one embodiment, a said time unit is a symbol.

In one embodiment, a said time unit comprises a positive integer number of consecutive symbols.

In one embodiment, a number of symbol(s) comprised in a said time unit is configured by a higher-layer parameter.

In one embodiment, the first interval value is measured in the time unit.

In one embodiment, the first interval value is measured in slots.

In one embodiment, the first interval value is measured in symbols.

In one embodiment, the first interval value is measured in milliseconds (ms).

In one embodiment, the first interval value is a positive integer.

In one embodiment, the first interval value is a positive real number.

In one embodiment, the first interval value is fixed.

In one embodiment, the first interval value is configured by a higher layer parameter.

In one embodiment, the symbol is a single-carrier symbol.

In one embodiment, the symbol is a multi-carrier symbol.

In one embodiment, the multicarrier symbol is an Orthogonal Frequency Division Multiplexing (OFDM) Symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol comprises a Cyclic Prefix (CP).

Embodiment 9

Embodiment 9 illustrates a schematic diagram of a relation between a number of TCI state(s) comprised by a first TCI state group and a first control channel candidate set according to one embodiment of the present application; as shown in FIG. 9.

In Embodiment 9, when the first TCI state group comprises only one TCI state, the first control channel candidate set does not comprise any control channel candidate that satisfies a first condition in the S search space sets; the first condition comprises that time-domain resources occupied are no earlier than the first time, and are associated with another control channel candidate in the S search space sets.

Embodiment 10

Embodiment 10 illustrates a schematic diagram of a relation between a number of TCI state(s) comprised by a first TCI state group and a first control channel candidate set according to another embodiment of the present application; as shown in FIG. 10A and FIG. 10B.

In Embodiment 10A, when the first TCI state group comprises more than one TCI state, the first control channel candidate set comprises all control channel candidates that satisfy the first condition in the S search space sets.

In Embodiment 10B, when the first TCI state group comprises more than one TCI state, the first control channel candidate set comprises all control channel candidates no earlier than the first time in the S search space sets.

Embodiment 11

Embodiment 11 illustrates a schematic diagram of a TCI state of a reference search space set according to one embodiment of the present application; as shown in FIG. 11.

In Embodiment 11, a reference search space set is any search space set among the S search space sets that does not comprise one control channel candidate in the first control channel candidate set, and a TCI state for monitoring control channel candidates in the reference search space set remains unchanged before and after the first time.

In one embodiment, a first given control channel candidate and a second given control channel candidate are any two control channel candidates in the reference search space set by which time-domain resources occupied are respectively earlier than the first time and no earlier than the first time, where a TCI state used for monitoring the first given control channel candidate is identical to a TCI state used for monitoring the second given control channel candidate.

In one embodiment, the phrase "before and after the first time" means: being earlier than the first time and being no earlier than the first time.

Embodiment 12

Embodiment 12 illustrates a schematic diagram of a first control channel candidate set with a first TCI state group comprising only one TCI state according to one embodiment of the present application; as shown in FIG. 12.

In Embodiment 12, the first signaling is used to determine a first control resource set pool out of M control resource set pools, the first control resource set pool being one of the M control resource set pools, and any of the M control resource set pools comprising at least one control resource set, M being a positive integer greater than 1; when the first TCI state group comprises only one TCI state, the first control channel candidate set comprises all control channel candidates that do not satisfy the first condition but satisfy a second condition in the S search space sets; the second condition comprises that time-domain resources occupied are no earlier than the first time and belong to the first control resource set pool.

In one embodiment, the sentence that "the first signaling is used to determine a first control resource set pool out of M control resource set pools" means that: the first signaling is used to indicate a first control resource set pool among the M control resource set pools.

In one embodiment, the sentence that "the first signaling is used to determine a first control resource set pool out of M control resource set pools" means that: a control channel candidate occupied by the first signaling is used to determine a first control resource set pool out of M control resource set pools.

In one embodiment, the sentence that "the first signaling is used to determine a first control resource set pool out of M control resource set pools" means that: there is a relationship of correspondence between a control channel candidate occupied by the first signaling and a first control resource set pool among M control resource set pools.

In one embodiment, the sentence that "the first signaling is used to determine a first control resource set pool out of M control resource set pools" means that: a first control resource set pool is a control resource set pool among M control resource set pools to which a control channel candidate occupied by the first signaling belongs.

Embodiment 13

Embodiment 13 illustrates a schematic diagram of a first field in a first signaling being used to determine a first TCI state group according to one embodiment of the present application; as shown in FIG. 13.

In Embodiment 13, the second information block indicates N TCI state groups; a value range of the first field includes N candidate values, the N candidate values respectively corresponding to the N TCI state groups, where the first TCI state group is one of the N TCI state groups that corresponds to a value of the first field in the first signaling; any of the N TCI state groups comprises at least one TCI state, N being a positive integer greater than 1; any of the N candidate values is a non-negative integer.

Embodiment 14

Embodiment 14 illustrates a schematic diagram of a first field in a first signaling being used to determine a first TCI state group according to another embodiment of the present application; as shown in FIG. 14.

In Embodiment 14, the second information block indicates N TCI states; a value range of the first field includes N candidate values, and any candidate value of the N candidate values is a non-negative integer, N being a positive integer greater than 1; the N candidate values respectively correspond to N TCI states, where a reference TCI state is one of the N TCI states that corresponds to a value of the first field in the first signaling; the first TCI state group comprises the reference TCI state; whether the reference TCI state belongs to a reference TCI state set is used to determine the number of the TCI state(s) comprised by the first TCI state group; when the reference TCI state does not belong to the reference TCI state set, the number of the TCI state(s) comprised by the first TCI state group is equal to 1; when the reference TCI state belongs to the reference TCI state set, the number of the TCI state(s) comprised by the first TCI state group is greater than 1.

In one embodiment, the second information block is borne by a higher layer signaling.

In one embodiment, the second information block comprises one Information Element (IE) in an RRC signaling.

In one embodiment, the second information block comprises multiple IEs in an RRC signaling.

In one embodiment, the second information block comprises part of fields in an IE in an RRC signaling.

In one embodiment, the second information block comprises part of fields in an IE PDSCH-Config.

In one embodiment, the second information block comprises a field tci-StatesToAddModList in an IE PD SCH-Config.

In one embodiment, for specific definitions of the IE PDSCH-Config and the field tci-StatesToAddModList, refer to 3GPP TS 38.331, Section 6.3.2.

In one embodiment, the second information block comprises TCI States Activation/Deactivation for UE-specific PDSCH MAC CE.

In one embodiment, the second information block comprises Enhanced TCI States Activation/Deactivation for UE-specific PDSCH MAC CE.

In one embodiment, for specific definitions of the TCI States Activation/Deactivation for UE-specific PDSCH MAC CE and the Enhanced TCI States Activation/Deactivation for UE-specific PDSCH MAC CE, refer to 3GPP TS 38.321, Section 6.1.3.

In one embodiment, a value range of the first field only comprises N candidate values.

In one embodiment, a value range of the first field also comprises at least one candidate value other than the N candidate values.

In one embodiment, the reference TCI state set is configured by a higher layer parameter.

In one embodiment, the reference TCI state set is predefined.

In one embodiment, the reference TCI state set is a subset of the N TCI states.

In one embodiment, the reference TCI state set is made up of at least one TCI state among the N TCI states.

In one embodiment, the reference TCI state set is made up of partial TCI states among the N TCI states.

In one embodiment, the second information block is used for indicating the reference TCI state set.

In one embodiment, the method in the first node comprises:

receiving a third information block;

herein, the third information block indicates the reference TCI state set.

In one subembodiment, the third information block is borne by a higher layer signaling.

In one subembodiment, the third information block comprises one Information Element (IE) in an RRC signaling.

In one subembodiment, the third information block comprises multiple IEs in an RRC signaling.

In one subembodiment, the third information block comprises part of fields in an IE in an RRC signaling.

In one subembodiment, the third information block comprises part of fields in an IE PDSCH-Config.

In one subembodiment, the second information block and the third information block belong to a same IE.

In one subembodiment, the second information block and the third information block respectively belong to different IEs.

Embodiment 15

Embodiment 15 illustrates a schematic diagram of a relation between a first TCI state group and whether a reference TCI state belongs to a reference TCI state set according to one embodiment of the present application; as shown in FIG. 15.

In Embodiment 15, the first TCI state group comprises the reference TCI state; whether the reference TCI state belongs to a reference TCI state set is used to determine the first TCI state group; when the reference TCI state does not belong to the reference TCI state set, the number of the TCI state(s) comprised by the first TCI state group is equal to 1, namely, the first TCI state group only comprises the reference TCI state; when the reference TCI state belongs to the reference TCI state set, the number of the TCI state(s) comprised by the first TCI state group is greater than 1, where each TCI state in the first TCI state group other than the reference TCI state is configured by a higher layer parameter.

In one embodiment, the reference TCI state set comprises more than one TCI state.

Embodiment 16

Embodiment 16 illustrates a schematic diagram of a relation between a first TCI state group and whether a reference TCI state belongs to a reference TCI state set according to another embodiment of the present application; as shown in FIG. 16.

In Embodiment 16, the reference TCI state set comprises T TCI state groups, any of the T TCI state groups comprising more than one TCI state, T being a positive integer greater than 1; when the reference TCI state belongs to the reference TCI state set, the first TCI state group is a TCI state group to which the reference TCI state belongs among the T TCI state groups; when the reference TCI state does not belong to the reference TCI state set, the first TCI state group only comprises the reference TCI state.

In one embodiment, whether the reference TCI state belongs to a reference TCI state set is used to determine the first TCI state group.

Embodiment 17

Embodiment 17 illustrates a structure block diagram of a processing device used in a first node according to one embodiment of the present application; as shown in FIG. 17. In FIG. 17, a processing device 1200 in a first node comprises a first receiver 1201 and a first transmitter 1202, where the first transmitter 1202 is optional.

In one embodiment, the first node is a UE.

In one embodiment, the first node is a relay node.

In one embodiment, the first receiver 1201 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1202 comprises at least one of the antenna 452, the transmitter 454, the transmitting processor 468, the multi-antenna transmitting processor 457, the controller/processor 459, the memory 460 or the data source 467 in Embodiment 4.

The first receiver 1201 receives a first information block; and receives a first signaling; and monitors control channel candidates in S search space sets.

In Embodiment 17, the first information block indicates S search space sets, S being a positive integer greater than 1; the first signaling comprises a first field, the first field in the first signaling determining a first Transmission Configuration Indicator (TCI) state group, the first TCI state group comprising at least one TCI state; the first signaling is used to determine a first time; starting from the first time, the first TCI state group is used for monitoring a first control channel candidate set; a number of TCI state(s) comprised by the first TCI state group is used to determine the first control channel candidate set in the S search space sets; when the first TCI state group comprises only one TCI state, the first control channel candidate set does not comprise any control channel candidate that satisfies a first condition in the S search space sets; the first condition comprises that time-domain resources occupied are no earlier than the first time, and are associated with another control channel candidate in the S search space sets. time-domain resources occupied are no earlier than the first time, and are associated with another control channel candidate in the S search space sets.

In one embodiment, a reference search space set is any search space set among the S search space sets that does not comprise one control channel candidate in the first control channel candidate set, and a TCI state for monitoring control channel candidates in the reference search space set remains unchanged before and after the first time.

In one embodiment, when the first TCI state group comprises more than one TCI state, the first control channel candidate set comprises all control channel candidates that satisfy the first condition in the S search space sets.

In one embodiment, when the first TCI state group comprises more than one TCI state, the first control channel candidate set comprises all control channel candidates no earlier than the first time in the S search space sets.

In one embodiment, when the first TCI state group comprises M TCI states and M is a positive integer greater than 1, the first control channel candidate set comprises M control channel candidate subsets, starting from the first time, the M TCI states are respectively used for monitoring the M control channel candidate subsets, any of the M control channel candidate subsets comprising at least one control channel candidate.

In one embodiment, the first signaling is used to determine a first control resource set pool out of M control resource set pools, the first control resource set pool being one of the M control resource set pools, and any of the M control resource set pools comprising at least one control resource set, M being a positive integer greater than 1; when the first TCI state group comprises only one TCI state, the first control channel candidate set comprises all control channel candidates that do not satisfy the first condition but satisfy a second condition in the S search space sets; the second condition comprises that time-domain resources occupied are no earlier than the first time and belong to the first control resource set pool.

In one embodiment, the first receiver 1201 receives a second information block; herein, the second information block indicates N TCI state groups; a value range of the first field includes N candidate values, the N candidate values respectively corresponding to the N TCI state groups, where the first TCI state group is one of the N TCI state groups that corresponds to a value of the first field in the first signaling; any of the N TCI state groups comprises at least one TCI state, N being a positive integer greater than 1; any of the N candidate values is a non-negative integer.

In one embodiment, the first receiver 1201 receives a second information block; herein, the second information block indicates N TCI states; a value range of the first field includes N candidate values, and any candidate value of the N candidate values is a non-negative integer, N being a positive integer greater than 1; the N candidate values respectively correspond to N TCI states, where a reference TCI state is one of the N TCI states that corresponds to a value of the first field in the first signaling; the first TCI state group comprises the reference TCI state; whether the reference TCI state belongs to a reference TCI state set is used to determine the number of the TCI state(s) comprised by the first TCI state group; when the reference TCI state does not belong to the reference TCI state set, the number of the TCI state(s) comprised by the first TCI state group is equal to 1; when the reference TCI state belongs to the reference TCI state set, the number of the TCI state(s) comprised by the first TCI state group is greater than 1.

In one embodiment, the reference TCI state set comprises T TCI state groups, any of the T TCI state groups comprising more than one TCI state, T being a positive integer greater than 1; when the reference TCI state belongs to the reference TCI state set, the first TCI state group is a TCI state group to which the reference TCI state belongs among the T TCI state groups; when the reference TCI state does not belong to the reference TCI state set, the first TCI state group only comprises the reference TCI state.

In one embodiment, the processing device 1200 in the first node comprises:

the first transmitter 1202: transmitting a first signal;

herein, the first signal comprises a HARQ-ACK associated with the first signaling.

In one embodiment, the first receiver 1201 receives a second signal; herein, the first signaling comprises scheduling information of the second signal.

Embodiment 18

Embodiment 18 illustrates a structure block diagram of a processing device used in a second node according to one embodiment of the present application; as shown in FIG. 18. In FIG. 18, a processing device 1300 in a second node comprises a second transmitter 1301 and a second receiver 1302, where the second receiver 1302 is optional.

In one embodiment, the second node is a base station.

In one embodiment, the second node is a UE.

In one embodiment, the second node is a relay node.

In one embodiment, the second transmitter 1301 comprises at least one of the antenna 420, the transmitter 418, the transmitting processor 416, the multi-antenna transmitting processor 471, the controller/processor 475 or the memory 476 in Embodiment 4.

In one embodiment, the second receiver 1302 comprises at least one of the antenna 420, the receiver 418, the receiving processor 470, the multi-antenna receiving processor 472, the controller/processor 475 or the memory 476 in Embodiment 4.

The second transmitter 1301 transmits a first information block; and transmits a first signaling.

In Embodiment 18, the first information block indicates S search space sets, S being a positive integer greater than 1; the first signaling comprises a first field, the first field in the first signaling determining a first Transmission Configuration Indicator (TCI) state group, the first TCI state group comprising at least one TCI state; the first signaling is used to determine a first time; starting from the first time, the first TCI state group is used by a target receiver of the first signaling for monitoring a first control channel candidate set; a number of TCI state(s) comprised by the first TCI state group is used to determine the first control channel candidate set in the S search space sets; when the first TCI state group comprises only one TCI state, the first control channel candidate set does not comprise any control channel candidate that satisfies a first condition in the S search space sets; the first condition comprises that time-domain resources occupied are no earlier than the first time, and are associated with another control channel candidate in the S search space sets. time-domain resources occupied are no earlier than the first time, and are associated with another control channel candidate in the S search space sets.

In one embodiment, a reference search space set is any search space set among the S search space sets that does not comprise one control channel candidate in the first control channel candidate set, and a TCI state used by a target receiver of the first signaling for monitoring control channel candidates in the reference search space set remains unchanged before and after the first time.

In one embodiment, when the first TCI state group comprises more than one TCI state, the first control channel candidate set comprises all control channel candidates that satisfy the first condition in the S search space sets.

In one embodiment, when the first TCI state group comprises more than one TCI state, the first control channel candidate set comprises all control channel candidates no earlier than the first time in the S search space sets.

In one embodiment, when the first TCI state group comprises M TCI states and M is a positive integer greater than 1, the first control channel candidate set comprises M control channel candidate subsets, starting from the first time, the M TCI states are respectively used by a target receiver of the first signaling for monitoring the M control channel candidate subsets, any of the M control channel candidate subsets comprising at least one control channel candidate.

In one embodiment, the first signaling is used to determine a first control resource set pool out of M control resource set pools, the first control resource set pool being one of the M control resource set pools, and any of the M control resource set pools comprising at least one control resource set, M being a positive integer greater than 1; when the first TCI state group comprises only one TCI state, the first control channel candidate set comprises all control channel candidates that do not satisfy the first condition but satisfy a second condition in the S search space sets; the second condition comprises that time-domain resources occupied are no earlier than the first time and belong to the first control resource set pool.

In one embodiment, the second transmitter 1301 transmits a second information block; herein, the second information block indicates N TCI state groups; a value range of the first field includes N candidate values, the N candidate values respectively corresponding to the N TCI state groups, where the first TCI state group is one of the N TCI state groups that corresponds to a value of the first field in the first signaling; any of the N TCI state groups comprises at least one TCI state, N being a positive integer greater than 1; any of the N candidate values is a non-negative integer.

In one embodiment, the second transmitter 1301 transmits a second information block; herein, the second information block indicates N TCI states; a value range of the first field includes N candidate values, and any candidate value of the N candidate values is a non-negative integer, N being a positive integer greater than 1; the N candidate values respectively correspond to N TCI states, where a reference TCI state is one of the N TCI states that corresponds to a value of the first field in the first signaling; the first TCI state group comprises the reference TCI state; whether the reference TCI state belongs to a reference TCI state set is used to determine the number of the TCI state(s) comprised by the first TCI state group; when the reference TCI state does not belong to the reference TCI state set, the number of the TCI state(s) comprised by the first TCI state group is equal to 1; when the reference TCI state belongs to the reference TCI state set, the number of the TCI state(s) comprised by the first TCI state group is greater than 1.

In one embodiment, the reference TCI state set comprises T TCI state groups, any of the T TCI state groups comprising more than one TCI state, T being a positive integer greater than 1; when the reference TCI state belongs to the reference TCI state set, the first TCI state group is a TCI state group to which the reference TCI state belongs among the T TCI state groups; when the reference TCI state does not belong to the reference TCI state set, the first TCI state group only comprises the reference TCI state.

In one embodiment, the processing device 1300 in the second node comprises:

the second receiver 1302: receiving a first signal;

herein, the first signal comprises a HARQ-ACK associated with the first signaling.

In one embodiment, the second transmitter 1301 transmits a second signal; herein, the first signaling comprises scheduling information of the second signal.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (JOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present application includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A first node for wireless communications, comprising at least a first antenna, a first transmitter, a first multi-antenna transmitting processor, a first transmitting processor, a first controller/processor, a first memory, a first receiving processor, and a first multi-antenna receiving processor, the first node characterized in comprising:

a first receiver, receiving a first information block; receiving a first signaling; and monitoring control channel candidates in S search space sets;

wherein the first information block indicates the S search space sets, S being a positive integer greater than 1; the first signaling comprises a first field, the first field in the first signaling determining a first Transmission Configuration Indicator (TCI) state group, the first TCI state group comprising at least one TCI state; the first signaling is used to determine a first time; starting from the first time, the first TCI state group is used for monitoring a first control channel candidate set; a number of TCI state(s) comprised by the first TCI state group is used to determine the first control channel candidate set in the S search space sets; when the first TCI state group comprises only one TCI state, the first control channel candidate set does not comprise any control channel candidate that satisfies a first condition in the S search space sets; the first condition comprises that time-domain resources occupied are no earlier than the first time, and are associated with another control channel candidate in the S search space sets.

2. The first node according to claim 1, characterized in that a reference search space set is any search space set among the S search space sets that does not comprise one control channel candidate in the first control channel candidate set, and a TCI state for monitoring control channel candidates in the reference search space set remains unchanged before and after the first time;

or, when the first TCI state group comprises more than one TCI state, the first control channel candidate set comprises all control channel candidates that satisfy the first condition in the S search space sets.

3. The first node according to claim 1, characterized in that when the first TCI state group comprises M TCI states and M is a positive integer greater than 1, the first control channel candidate set comprises M control channel candidate subsets, starting from the first time, the M TCI states are respectively used for monitoring the M control channel candidate subsets, any of the M control channel candidate subsets comprising at least one control channel candidate.

4. The first node according to claim 1, characterized in that the first signaling is used to determine a first control resource set pool out of M control resource set pools, the first control resource set pool being one of the M control resource set pools, and any of the M control resource set pools comprising at least one control resource set, M being a positive integer greater than 1; when the first TCI state group comprises only one TCI state, the first control channel candidate set comprises all control channel candidates that do not satisfy the first condition but satisfy a second condition in the S search space sets; the second condition comprises that time-domain resources occupied are no earlier than the first time and belong to the first control resource set pool.

5. The first node according to claim 1, characterized in that the first receiver receives a second information block; wherein the second information block indicates N TCI states; a value range of the first field includes N candidate values, and any candidate value of the N candidate values is a non-negative integer, N being a positive integer greater than 1; the N candidate values respectively correspond to N TCI states, where a reference TCI state is one of the N TCI states that corresponds to a value of the first field in the first signaling; the first TCI state group comprises the reference TCI state; whether the reference TCI state belongs to a reference TCI state set is used to determine the number of the TCI state(s) comprised by the first TCI state group; when the reference TCI state does not belong to the reference TCI state set, the number of the TCI state(s) comprised by the first TCI state group is equal to 1; when the reference TCI state belongs to the reference TCI state set, the number of the TCI state(s) comprised by the first TCI state group is greater than 1;

or, the first receiver receives a second information block; wherein the second information block indicates N TCI states; a value range of the first field includes N candidate values, and any candidate value of the N candidate values is a non-negative integer, N being a positive integer greater than 1; the N candidate values respectively correspond to N TCI states, where a reference TCI state is one of the N TCI states that corresponds to a value of the first field in the first signaling; the first TCI state group comprises the reference TCI state; whether the reference TCI state belongs to a reference TCI state set is used to determine the number of the TCI state(s) comprised by the first TCI state group; when the reference TCI state does not belong to the reference TCI state set, the number of the TCI state(s) comprised by the first TCI state group is equal to 1; when the reference TCI state belongs to the reference TCI state set, the number of the TCI state(s) comprised by the first TCI state group is greater than 1; the reference TCI state set comprises T TCI state groups, any of the T TCI state groups comprising more than one TCI state, T being a positive integer greater than 1; when the reference TCI state belongs to the reference TCI state set, the first TCI state group is a TCI state group to which the reference TCI state belongs among the T TCI state groups; when the reference TCI state does not belong to the reference TCI state set, the first TCI state group only comprises the reference TCI state.

6. A second node for wireless communications, comprising at least a second antenna, a second receiver, a second multi-antenna transmitting processor, a second transmitting processor, a second controller/processor, a second memory, a data source, a second receiving processor, and a second multi-antenna receiving processor, the second node characterized in comprising:

a second transmitter, transmitting a first information block; and transmitting a first signaling;

wherein the first information block indicates the S search space sets, S being a positive integer greater than 1; the first signaling comprises a first field, the first field in the first signaling determining a first Transmission Configuration Indicator (TCI) state group, the first TCI state group comprising at least one TCI state; the first signaling is used to determine a first time; starting from the first time, the first TCI state group is used by a target receiver of the first signaling for monitoring a first control channel candidate set; a number of TCI state(s) comprised by the first TCI state group is used to determine the first control channel candidate set in the S search space sets; when the first TCI state group comprises only one TCI state, the first control channel candidate set does not comprise any control channel candidate that satisfies a first condition in the S search space sets; the first condition comprises that time-domain resources occupied are no earlier than the first time, and are associated with another control channel candidate in the S search space sets.

7. The second node according to claim 6, characterized in that a reference search space set is any search space set among the S search space sets that does not comprise one control channel candidate in the first control channel candidate set, and a TCI state used by a target receiver of the first signaling for monitoring control channel candidates in the reference search space set remains unchanged before and after the first time;

or, when the first TCI state group comprises more than one TCI state, the first control channel candidate set comprises all control channel candidates that satisfy the first condition in the S search space sets.

8. The second node according to claim 6, characterized in that when the first TCI state group comprises M TCI states and M is a positive integer greater than 1, the first control channel candidate set comprises M control channel candidate subsets, starting from the first time, the M TCI states are respectively used by a target receiver of the first signaling for monitoring the M control channel candidate subsets, any of the M control channel candidate subsets comprising at least one control channel candidate.

9. The second node according to claim 6, characterized in that the first signaling is used to determine a first control resource set pool out of M control resource set pools, the first control resource set pool being one of the M control resource set pools, and any of the M control resource set pools comprising at least one control resource set, M being a positive integer greater than 1; when the first TCI state group comprises only one TCI state, the first control channel candidate set comprises all control channel candidates that do not satisfy the first condition but satisfy a second condition in the S search space sets; the second condition comprises that time-domain resources occupied are no earlier than the first time and belong to the first control resource set pool.

10. The second node according to claim 6, characterized in that the second transmitter transmits a second information block; wherein the second information block indicates N TCI states; a value range of the first field includes N candidate values, and any candidate value of the N candidate values is a non-negative integer, N being a positive integer greater than 1; the N candidate values respectively correspond to N TCI states, where a reference TCI state is one of the N TCI states that corresponds to a value of the first field in the first signaling; the first TCI state group comprises the reference TCI state; whether the reference TCI state belongs to a reference TCI state set is used to determine the number of the TCI state(s) comprised by the first TCI state group; when the reference TCI state does not belong to the reference TCI state set, the number of the TCI state(s) comprised by the first TCI state group is equal to 1; when the reference TCI state belongs to the reference TCI state set, the number of the TCI state(s) comprised by the first TCI state group is greater than 1;

or, the second transmitter transmits a second information block; wherein the second information block indicates N TCI states; a value range of the first field includes N candidate values, and any candidate value of the N candidate values is a non-negative integer, N being a positive integer greater than 1; the N candidate values respectively correspond to N TCI states, where a reference TCI state is one of the N TCI states that corresponds to a value of the first field in the first signaling; the first TCI state group comprises the reference TCI state; whether the reference TCI state belongs to a reference TCI state set is used to determine the number of the TCI state(s) comprised by the first TCI state group; when the reference TCI state does not belong to the reference TCI state set, the number of the TCI state(s) comprised by the first TCI state group is equal to 1; when the reference TCI state belongs to the reference TCI state set, the number of the TCI state(s) comprised by the first TCI state group is greater than 1; the reference TCI state set comprises T TCI state groups, any of the T TCI state groups comprising more than one TCI state, T being a positive integer greater than 1; when the reference TCI state belongs to the reference TCI state set, the first TCI state group is a TCI state group to which the reference TCI state belongs among the T TCI state groups; when the reference TCI state does not belong to the reference TCI state set, the first TCI state group only comprises the reference TCI state.

11. A method in a first node for wireless communications, characterized in comprising:

receiving a first information block;

receiving a first signaling; and monitoring control channel candidates in S search space sets;

wherein the first information block indicates the S search space sets, S being a positive integer greater than 1; the first signaling comprises a first field, the first field in the first signaling determining a first Transmission Configuration Indicator (TCI) state group, the first TCI state group comprising at least one TCI state; the first signaling is used to determine a first time; starting from the first time, the first TCI state group is used for monitoring a first control channel candidate set; a number of TCI state(s) comprised by the first TCI state group is used to determine the first control channel candidate set in the S search space sets; when the first TCI state group comprises only one TCI state, the first control channel candidate set does not comprise any control channel candidate that satisfies a first condition in the S search space sets; the first condition comprises that time-domain resources occupied are no earlier than the first time, and are associated with another control channel candidate in the S search space sets.

12. The method according to claim 11, characterized in that a reference search space set is any search space set among the S search space sets that does not comprise one control channel candidate in the first control channel candidate set, and a TCI state for monitoring control channel candidates in the reference search space set remains unchanged before and after the first time;

or, when the first TCI state group comprises more than one TCI state, the first control channel candidate set comprises all control channel candidates that satisfy the first condition in the S search space sets.

13. The method according to claim 11, characterized in that when the first TCI state group comprises M TCI states and M is a positive integer greater than 1, the first control channel candidate set comprises M control channel candidate subsets, starting from the first time, the M TCI states are respectively used for monitoring the M control channel candidate subsets, any of the M control channel candidate subsets comprising at least one control channel candidate.

14. The method according to claim 11, characterized in that the first signaling is used to determine a first control resource set pool out of M control resource set pools, the first control resource set pool being one of the M control resource set pools, and any of the M control resource set pools comprising at least one control resource set, M being a positive integer greater than 1; when the first TCI state group comprises only one TCI state, the first control channel candidate set comprises all control channel candidates that do not satisfy the first condition but satisfy a second condition in the S search space sets; the second condition comprises that time-domain resources occupied are no earlier than the first time and belong to the first control resource set pool.

15. The method according to claim 11, characterized in comprising: receiving a second information block; wherein the second information block indicates N TCI states; a value range of the first field includes N candidate values, and any candidate value of the N candidate values is a non-negative integer, N being a positive integer greater than 1; the N candidate values respectively correspond to N TCI states, where a reference TCI state is one of the N TCI states that corresponds to a value of the first field in the first signaling; the first TCI state group comprises the reference TCI state; whether the reference TCI state belongs to a reference TCI state set is used to determine the number of the TCI state(s) comprised by the first TCI state group; when the reference TCI state does not belong to the reference TCI state set, the number of the TCI state(s) comprised by the first TCI state group is equal to 1; when the reference TCI state belongs to the reference TCI state set, the number of the TCI state(s) comprised by the first TCI state group is greater than 1; or, comprising: receiving a second information block; wherein the second information block indicates N TCI states; a value range of the first field includes N candidate values, and any candidate value of the N candidate values is a non-negative integer, N being a positive integer greater than 1; the N candidate values respectively correspond to N TCI states, where a reference TCI state is one of the N TCI states that corresponds to a value of the first field in the first signaling; the first TCI state group comprises the reference TCI state; whether the reference TCI state belongs to a reference TCI state set is used to determine the number of the TCI state(s) comprised by the first TCI state group; when the reference TCI state does not belong to the reference TCI state set, the number of the TCI state(s) comprised by the first TCI state group is equal to 1; when the reference TCI state belongs to the reference TCI state set, the number of the TCI state(s) comprised by the first TCI state group is greater than 1; the reference TCI state set comprises T TCI state groups, any of the T TCI state groups comprising more than one TCI state, T being a positive integer greater than 1; when the reference TCI state belongs to the reference TCI state set, the first TCI state group is a TCI state group to which the reference TCI state belongs among the T TCI state groups; when the reference TCI state does not belong to the reference TCI state set, the first TCI state group only comprises the reference TCI state.

16. A method in a second node for wireless communications, characterized in comprising:

transmitting a first information block; and transmitting a first signaling;

wherein the first information block indicates the S search space sets, S being a positive integer greater than 1; the first signaling comprises a first field, the first field in the first signaling determining a first Transmission Configuration Indicator (TCI) state group, the first TCI state group comprising at least one TCI state; the first signaling is used to determine a first time; starting from the first time, the first TCI state group is used by a target receiver of the first signaling for monitoring a first control channel candidate set; a number of TCI state(s) comprised by the first TCI state group is used to determine the first control channel candidate set in the S search space sets; when the first TCI state group comprises only one TCI state, the first control channel candidate set does not comprise any control channel candidate that satisfies a first condition in the S search space sets; the first condition comprises that time-domain resources occupied are no earlier than the first time, and are associated with another control channel candidate in the S search space sets.

17. The method according to claim 16, characterized in that a reference search space set is any search space set among the S search space sets that does not comprise one control channel candidate in the first control channel candidate set, and a TCI state used by a target receiver of the first signaling for monitoring control channel candidates in the reference search space set remains unchanged before and after the first time;

or, when the first TCI state group comprises more than one TCI state, the first control channel candidate set comprises all control channel candidates that satisfy the first condition in the S search space sets.

18. The method according to claim 16, characterized in that when the first TCI state group comprises M TCI states and M is a positive integer greater than 1, the first control channel candidate set comprises M control channel candidate subsets, starting from the first time, the M TCI states are respectively used by a target receiver of the first signaling for monitoring the M control channel candidate subsets, any of the M control channel candidate subsets comprising at least one control channel candidate.

19. The method according to claim 16, characterized in that the first signaling is used to determine a first control resource set pool out of M control resource set pools, the first control resource set pool being one of the M control resource set pools, and any of the M control resource set pools comprising at least one control resource set, M being a positive integer greater than 1;

when the first TCI state group comprises only one TCI state, the first control channel candidate set comprises all control channel candidates that do not satisfy the first condition but satisfy a second condition in the S search space sets; the second condition comprises that time-domain resources occupied are no earlier than the first time and belong to the first control resource set pool.

20. The method according to claim 16, characterized in comprising: transmitting a second information block; wherein the second information block indicates N TCI states; a value range of the first field includes N candidate values, and any candidate value of the N candidate values is a non-negative integer, N being a positive integer greater than 1; the N candidate values respectively correspond to N TCI states, where a reference TCI state is one of the N TCI states that corresponds to a value of the first field in the first signaling; the first TCI state group comprises the reference TCI state; whether the reference TCI state belongs to a reference TCI state set is used to determine the number of the TCI state(s) comprised by the first TCI state group; when the reference TCI state does not belong to the reference TCI state set, the number of the TCI state(s) comprised by the first TCI state group is equal to 1; when the reference TCI state belongs to the reference TCI state set, the number of the TCI state(s) comprised by the first TCI state group is greater than 1;

or, comprising: transmitting a second information block; wherein the second information block indicates N TCI states; a value range of the first field includes N candidate values, and any candidate value of the N candidate values is a non-negative integer, N being a positive integer greater than 1; the N candidate values respectively correspond to N TCI states, where a reference TCI state is one of the N TCI states that corresponds to a value of the first field in the first signaling; the first TCI state group comprises the reference TCI state; whether the reference TCI state belongs to a reference TCI state set is used to determine the number of the TCI state(s) comprised by the first TCI state group; when the reference TCI state does not belong to the reference TCI state set, the number of the TCI state(s) comprised by the first TCI state group is equal to 1; when the reference TCI state belongs to the reference TCI state set, the number of the TCI state(s) comprised by the first TCI state group is greater than 1; the reference TCI state set comprises T TCI state groups, any of the T TCI state groups comprising more than one TCI state, T being a positive integer greater than 1; when the reference TCI state belongs to the reference TCI state set, the first TCI state group is a TCI state group to which the reference TCI state belongs among the T TCI state groups; when the reference TCI state does not belong to the reference TCI state set, the first TCI state group only comprises the reference TCI state.

* * * * *